(12) United States Patent
Jiang et al.

(10) Patent No.: US 10,956,771 B2
(45) Date of Patent: Mar. 23, 2021

(54) IMAGE RECOGNITION METHOD, TERMINAL, AND STORAGE MEDIUM

(71) Applicant: TENCENT TECHNOLOGY (SHENZHEN) COMPANY LIMITED, Shenzhen (CN)

(72) Inventors: Wenhao Jiang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 16/552,738

(22) Filed: Aug. 27, 2019

(65) Prior Publication Data

US 2019/0385004 A1 Dec. 19, 2019

Related U.S. Application Data

(63) Continuation of application No. PCT/CN2018/105009, filed on Sep. 11, 2018.

(30) Foreign Application Priority Data

Sep. 11, 2017 (CN) .......................... 201710814187.2

(51) Int. Cl.
*G06K 9/46* (2006.01)
*G06F 16/583* (2019.01)
(Continued)

(52) U.S. Cl.
CPC ......... *G06K 9/4604* (2013.01); *G06F 16/583* (2019.01); *G06F 16/5866* (2019.01); *G06K 9/6256* (2013.01); *G06N 3/08* (2013.01)

(58) Field of Classification Search
CPC .. G06K 9/4604; G06K 9/6256; G06K 9/4628; G06K 9/6274; G06K 9/48;
(Continued)

(56) References Cited

U.S. PATENT DOCUMENTS

| 8,165,354 B1 | 4/2012 | Zhao |
| 9,582,431 B2 * | 2/2017 | Cohen ................... G06F 3/0608 |

(Continued)

FOREIGN PATENT DOCUMENTS

| CN | 106446782 A | 2/2017 |
| CN | 106845411 A | 6/2017 |

(Continued)

OTHER PUBLICATIONS

The World Intellectual Property Organization (WIPO) International Search Report for PCT/CN2018/105009 dated Dec. 19, 2018 6 Pages (including translation).

(Continued)

*Primary Examiner* — Michael S Osinski
(74) *Attorney, Agent, or Firm* — Anova Law Group, PLLC

(57) ABSTRACT

An image recognition method, a terminal, and a storage medium are provided. The method includes: performing feature extraction on a to-be-recognized image by using an encoder, to obtain a feature vector and a first annotation vector set; performing initialization processing on the feature vector, to obtain first initial input data; and generating first guiding information based on the first annotation vector set by using a first guiding network model. The first guiding network model is configured to generate guiding information according to an annotation vector set of any image. The method also includes determining a descriptive statement of (Continued)

the image based on the first guiding information, the first annotation vector set, and the first initial input data by using a decoder.

20 Claims, 12 Drawing Sheets

(51) Int. Cl.
  *G06F 16/58* (2019.01)
  *G06K 9/62* (2006.01)
  *G06N 3/08* (2006.01)
(58) Field of Classification Search
  CPC . G06K 9/627; G06K 9/66; G06K 9/00; G06F 16/583; G06F 16/5866; G06N 3/08; G06N 3/0445; G06N 3/0454; G06N 3/088; G06N 3/04; G06N 3/084; H04N 19/46; H04N 19/176; H04N 19/61; H04N 19/117; H04N 19/122; H04N 19/17; H04N 19/182; H04N 19/51; H04N 19/577; H04N 19/60; H04N 19/82; H04N 19/85; H04N 19/86; G06T 2207/20081; G06T 2207/20084
  See application file for complete search history.

(56) References Cited

U.S. PATENT DOCUMENTS

| | | | | |
|---|---|---|---|---|
| 10,783,393 | B2* | 9/2020 | Molchanov | G06K 9/00234 |
| 2008/0285650 | A1* | 11/2008 | Chappalli | H04N 19/57 375/240.16 |
| 2010/0027686 | A1* | 2/2010 | Zuo | H04N 19/46 375/240.29 |
| 2010/0322303 | A1* | 12/2010 | Wada | H04N 19/61 375/240.01 |
| 2012/0213278 | A1* | 8/2012 | Yasugi | H04N 19/119 375/240.12 |
| 2012/0308144 | A1* | 12/2012 | Tokunaga | H04N 19/53 382/206 |
| 2013/0022124 | A1* | 1/2013 | Sekiguchi | H04N 19/46 375/240.16 |
| 2013/0230099 | A1* | 9/2013 | DeForest | H04N 19/543 375/240.08 |
| 2014/0254936 | A1* | 9/2014 | Sun | G06T 9/00 382/195 |
| 2015/0104110 | A1* | 4/2015 | Balestri | G06T 9/00 382/251 |
| 2015/0169988 | A1* | 6/2015 | Zhang | G06K 9/6212 382/209 |
| 2016/0342895 | A1 | 11/2016 | Gao et al. | |
| 2017/0026665 | A1* | 1/2017 | Duan | H04N 19/94 |
| 2017/0098153 | A1 | 4/2017 | Mao et al. | |
| 2018/0032846 | A1* | 2/2018 | Yang | G06K 9/4604 |
| 2018/0262759 | A1* | 9/2018 | Fracastoro | H04N 19/182 |
| 2019/0311202 | A1* | 10/2019 | Lee | G06K 9/6256 |
| 2019/0354804 | A1* | 11/2019 | Ros Sanchez | G06K 9/6257 |
| 2020/0104940 | A1* | 4/2020 | Krishnan | G06Q 40/08 |
| 2020/0228840 | A1* | 7/2020 | Fracastoro | H04N 19/17 |
| 2020/0250528 | A1* | 8/2020 | van den Oord | G06N 3/0454 |
| 2020/0296149 | A1* | 9/2020 | Wang | H04N 21/26603 |
| 2020/0349673 | A1* | 11/2020 | Yoo | G06N 3/0454 |
| 2020/0387698 | A1* | 12/2020 | Yi | G06T 7/174 |

FOREIGN PATENT DOCUMENTS

| | | |
|---|---|---|
| CN | 107038221 A | 8/2017 |
| CN | 108304846 A | 7/2018 |
| KR | 20170043582 A | 4/2017 |

OTHER PUBLICATIONS

The European Patent Office (EPO) The Extended European Search Report for 18853742.7 dated Nov. 19, 2020 10 Pages.
Korean Intellectual Property Office (KIPO) Office Action 1 for 20197036824 dated Dec. 18, 2020 12 Pages (including translation).
Zhilin Yang et al., "Review Networks for Caption Generation," NIPS 2016, arXiv:1605.07912, Oct. 27, 2016 (Oct. 27, 2016), the whole document. 9 pages.
Long Chen et al., "SCA-CNN: Spatial and Channel-wise Attention in Convolutional Networks for Image Captioning," arXiv:1611.05594, Nov. 17, 2016 (Nov. 17, 2016), the whole document. 10 pages.
Ting Yao et al., "Boosting Image Captioning with Attributes," arXiv:1611.01646, Nov. 5, 2016 (Nov. 5, 2016), the whole document. 11 pages.
Kelvin Xu et al., "Show, Attend and Tell: Neural Image Caption Generation with Visual Attention," arXiv:1502.03044, Apr. 19, 2016 (Apr. 19, 2016), the whole document. 22 pages.
Steven J Rennie et al., "Self-critical Sequence Training for Image Captioning," arXiv:1612.00563, Dec. 2, 2016 (Dec. 6, 2016), the whole document. 16 pages.
Zichao Yang et al., "Stacked attention networks for image question answering," 2016 IEEE Conference on Computer Cision and Pattern Recognition (CVPR), Jun. 27, 2016 (Jun. 27, 2016), pp. 21-29, the whole document. 9 pages.

* cited by examiner

IMAGE RECOGNITION METHOD, TERMINAL, AND STORAGE MEDIUM

CROSS-REFERENCES TO RELATED APPLICATIONS

This application is a continuation application of PCT Patent Application No. PCT/CN2018/105009, filed on Sep. 11, 2018, which claims priority to Chinese Patent Application No. 201710814187.2, entitled "IMAGE RECOGNITION METHOD AND APPARATUS, AND STORAGE MEDIUM" filed with the China National Intellectual Property Administration on Sep. 11, 2017, the entire contents of both of which are incorporated herein by reference.

FIELD OF TECHNOLOGY

Embodiments of this application relate to the field of machine learning, and in particular, to an image recognition method, a terminal, and a storage medium.

BACKGROUND OF THE DISCLOSURE

With development of science and technologies and requirements of people for convenient man-machine interactive manners, machine learning has been widely applied to the image recognition field. For example, in scenarios such as early children education, image retrieval, and navigation for the blind, people usually expect machines to automatically recognize images and provide descriptive statements that can accurately describe image content, that is, translate the images into a natural language, so as to quickly understand the images or classify the images by using the natural language.

At present, an image recognition system framework usually includes an encoder and a decoder. Based on the system framework, the related technology provides an image recognition method that uses extracted image features and guiding information to obtain a descriptive statement of the image. However, existing methods only uses manually-extracted features as guiding information, which are not automatically learned. Such procedure requires manual labor and cannot be self-adaptive to individual image recognition tasks.

SUMMARY

Embodiments of this application provide an image recognition method, a terminal, and a storage medium, to resolve the problem of relatively low quality of a generated descriptive statement because a descriptive statement of an image cannot be accurately generated by using artificially designed specific guiding information in the related technology. The technical solutions are as follows:

According to a first aspect, an image recognition method is provided, the method is performed by a terminal. The method includes: performing feature extraction on a to-be-recognized image by using an encoder, to obtain a feature vector and a first annotation vector set; performing initialization processing on the feature vector, to obtain first initial input data; and generating first guiding information based on the first annotation vector set by using a first guiding network model. The first guiding network model is configured to generate guiding information according to an annotation vector set of any image. The method also includes determining a descriptive statement of the image based on the first guiding information, the first annotation vector set, and the first initial input data by using a decoder.

According to a second aspect, an image recognition apparatus is provided, and the apparatus includes: a memory and a processor coupled to the memory. The processor is configured to perform feature extraction on a to-be-recognized image by using an encoder, to obtain a feature vector and a first annotation vector set; perform initialization processing on the feature vector, to obtain first initial input data; and generate first guiding information based on the first annotation vector set by using a first guiding network model. The first guiding network model is configured to generate guiding information according to an annotation vector set of any image. The processor is also configured to determine a descriptive statement of the image based on the first guiding information, the first annotation vector set, and the first initial input data by using a decoder.

According to a third aspect, a terminal is provided, the terminal includes a processor and a memory, the memory stores at least one instruction, at least one program, and a code set or an instruction set, and the instruction, the program, and the code set or the instruction set are loaded and executed by the processor to implement the following operations: performing feature extraction on a to-be-recognized target image by using an encoder, to obtain a feature vector and a first annotation vector set; performing initialization processing on the feature vector, to obtain first initial input data; generating first guiding information based on the first annotation vector set by using a first guiding network model, the first guiding network model being configured to generate guiding information according to an annotation vector set of any image; and determining a descriptive statement of the target image based on the first guiding information, the first annotation vector set, and the first initial input data by using a decoder.

According to a fourth aspect, a non-transitory computer readable storage medium is provided, the storage medium stores at least one instruction, at least one program, and a code set or an instruction set, and the instruction, the program, and the code set or the instruction set are loaded and executed by a processor to implement the image recognition method according to the first aspect.

The technical solutions provided in the embodiments of this application bring about the following beneficial effects:
In the embodiments of this application, a guiding network model is added between an encoder and a decoder, and after an annotation vector set is extracted from a target image, guiding information may be generated based on the annotation vector set by using the guiding network model. Because the guiding network model can generate, according to an annotation vector set of any image, guiding information of the image, the guiding information generated by using the guiding network model can be more suitable for a generation process of a descriptive statement of the target image and has higher accuracy, thereby accurately guiding an encoding process of the target image, and improving quality of the generated descriptive statement.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Before the embodiments of this application are explained and described in detail, terms involved in the embodiments of this application are explained and described first.

Encoder

The encoder is configured to encode an image to generate a vector, and the encoder usually uses a convolutional neural network (CNN) model.

Decoder

The decoder is configured to decode a vector generated by an encoder, to translate the vector generated by the encoder into a descriptive statement of the image, and the decoder usually uses a recurrent neural network (RNN) model.

Guiding Information

The guiding information is information obtained by processing an image, is usually represented as a vector, and can be used as a part of an input of the decoder to guiding a decoding process. Introducing the guiding information to the decoder can improve performance of the decoder, ensure that the decoder can generate a better descriptive statement, and improve quality of the generated descriptive statement.

CNN Model

The CNN model refers to a neural network model for image classification and recognition developed based on a conventional multi-layer neural network. The CNN model usually includes a plurality of convolutional layers and at least one fully connected layer, and can perform feature extraction on an image.

RNN Model

The conventional neural network has no memory function, that is, an input of the conventional neural network is independent data without context correlation. However, in actual application, the input is usually some serialized inputs with obvious context features. For example, if a next word in a descriptive statement needs to be predicted, in this case, an output of the neural network needs to rely on a previous input. That is, it is required that the neural network has a memory function. The RNN model is a neural network that has nodes directionally connected as a ring and that has a memory function, and may use the internal memory function to circularly process input data.

Figure 1:
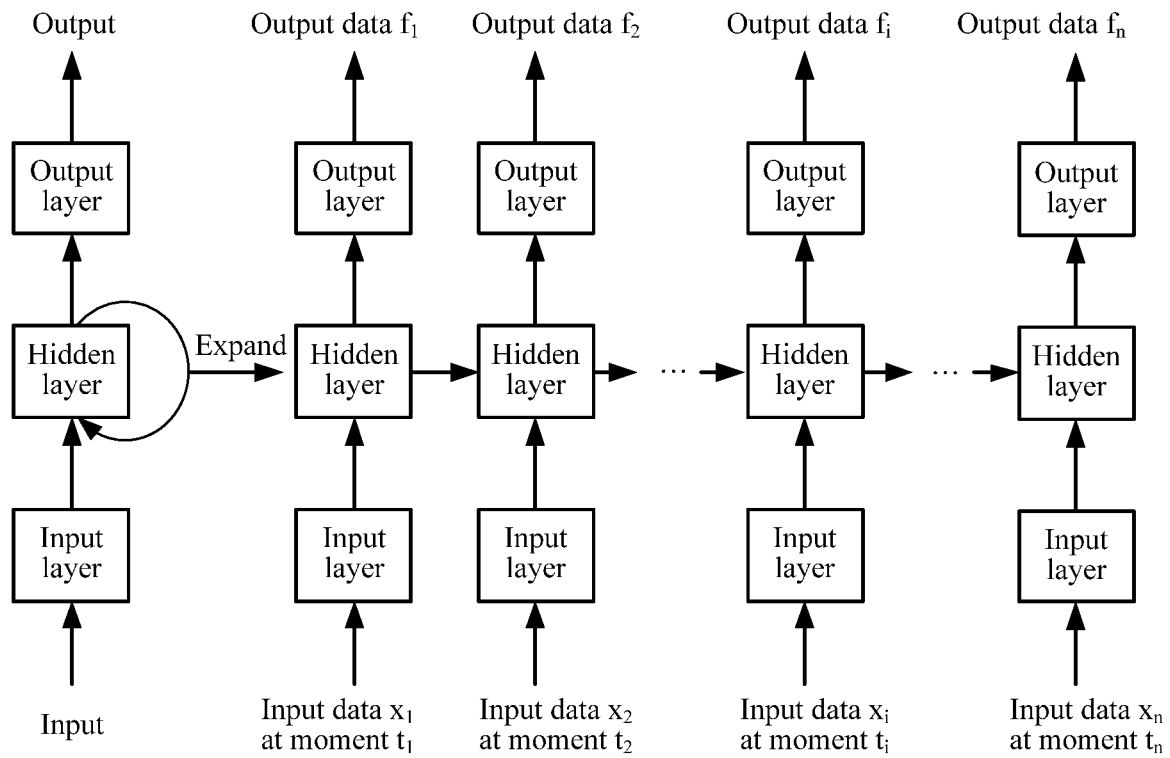
FIG. 1 is a schematic diagram of a logical structure of an RNN model according to an embodiment of this application.

FIG. 1 is a schematic diagram of a logical structure of an RNN model according to an embodiment of this application. As shown on the left of FIG. 1, the RNN model is a three-layer structure including an input layer, a hidden layer, and an output layer, and the hidden layer is a ring structure. The input layer is connected to the hidden layer, and the hidden layer is connected to the output layer.

For ease of describing the function of the RNN model, the structure of the RNN model shown on the left side of FIG. 1 is expanded according to a time sequence, and the structure shown on the right side of FIG. 1 may be obtained. Input data received by the input layer of the RNN model is data sorted according to a time sequence, that is, the input data received by the input layer is sequence data. For ease of description, the sequence data is marked as $x_1, x_2, \ldots, x_i, \ldots,$ and $x_n$, moments respectively corresponding to the data in the sequence data are marked as $t_1, t_2, \ldots, t_i, \ldots,$ and $t_n$, output data obtained by processing $x_1, x_2, \ldots,$ and $x_n$ respectively is marked as $f_2, \ldots, f_i, \ldots,$ and $f_n$, and steps of processing the input data by the RNN model according to a time sequence (temporal information) may be referred to as sequential steps, where n is a quantity of times of circularly processing the input data by the RNN model.

As shown on the right side of FIG. 1, in the expanded RNN model, input data received by the input layer at moment $t_1$ is $x_1$, and $x_1$ is transmitted to the hidden layer, and the hidden layer processes $x_1$, and transmits the processed data to the output layer, to obtain output data $f_1$ at moment $t_1$. Input data received by the input layer at moment $t_2$ is $x_2$, and $x_2$ is transmitted to the hidden layer. In this case, the hidden layer processes $x_2$ according to output data $f_1$ at moment $t_1$, and transmits the processed data to the output layer, to obtain output data $f_2$ at moment $t_2$. That is, at any moment $t_i$, in addition to input data $x_i$ transmitted by the input layer at moment $t_i$, the hidden layer further receives output data $f_{i-1}$ at moment $t_{i-1}$, and processes $x_i$ according to $f_{i-1}$, to obtain output data $f_i$ at moment $t_i$.

Long Short-Term Memory (LSTM) Network Model

The LSTM network model is a special RNN model that can process and predict an important event with a relatively long interval and delay in a time sequence. The LSTM network model includes an LSTM unit. The LSTM unit is provided with an input gate, a forget gate, and an output gate. In each sequential step, input data may be processed based on the disposed input gate, forget gate, and output gate.

Figure 2:
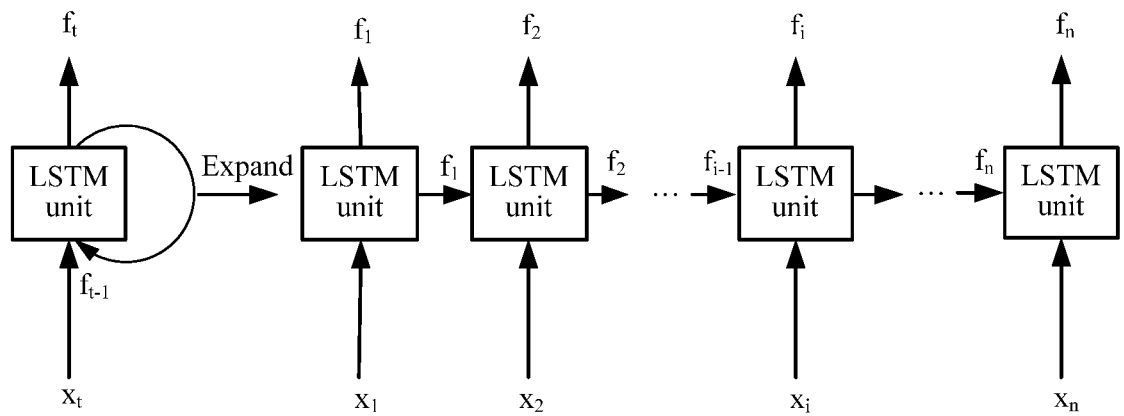
FIG. 2 is a schematic diagram of a logical structure of an LSTM model according to an embodiment of this application.

FIG. 2 is a schematic diagram of a logical structure of an LSTM network model according to an embodiment of this application. As shown on the left side of FIG. 2, the LSTM network model includes an LSTM unit, and the LSTM unit is a ring structure. For any sequential step t performed by the LSTM unit, the LSTM unit may process input data $x_t$ of sequential step t and output data $f_{t-1}$ of previous sequential step t−1, to obtain output data $f_t$ of the sequential step t.

As shown on the right side of FIG. 2, in the LSTM network model expanded according to a time sequence, after receiving input data $x_1$ of sequential step $t_1$, the LSTM unit may process $x_1$ to obtain output data $f_1$ of sequential step $t_1$, and then input $f_1$ to the LSTM unit. After receiving input data $x_2$ of sequential step $t_2$, the LSTM unit may process $f_1$ and $x_2$, to obtain output data $f_2$ of sequential step $t_2$, until output data $f_n$ of sequential step $t_n$ is obtained based on input data $x_n$ of sequential step $t_n$ and output data $f_{n-1}$ of sequential step $t_{n-1}$, where n is a quantity of times of circularly processing the input data by the LSTM network model.

Review-net

The review-net an image recognition network based on an encoder-decoder framework, and includes a reviewer and a decoder. Both the reviewer and the decoder usually use a CNN model. The reviewer may further dig an interactive relationship between a global feature and a local feature extracted from an image by the encoder, and generate initial input data for the decoder based on the interactive relationship between the global feature and the local feature, to improve performance of the decoder.

Next, application scenarios of the embodiments of this application are described.

In some embodiments, an image recognition system function as follows: first performing feature extraction on an image by using an encoder, to obtain a feature vector and an annotation vector set. The feature vector is obtained by performing global feature extraction on the image, and the annotation vector set is obtained by performing local feature extraction on the image. Then, initialization processing is performed on the feature vector, to obtain initial input data. The initial input data is used for indicating an initial state of the decoder, and usually includes initial hidden state information and initial memory cell state information. Next, artificially designed specific information is extracted from the image as guiding information, and the annotation vector set and the initial input data are decoded based on the guiding information by using the decoder, to obtain a descriptive statement of the image. The guiding information is used for guiding an encoding process of the encoder, to improve quality of the generated descriptive statement, so that the generated descriptive statement can more accurately describe the image and conform to semantics.

The embodiments of this application may be applied to scenarios such as early children education, image search/retrieval, and a reading or chatting system for the blind. In these scenarios, images usually need to be automatically translated into a natural language.

For example, to improve a capability of young children for recognizing objects by looking at images, an image recognition method provided in the embodiments of this application may be used to translate images seen by young children into corresponding descriptive statements, and then transform the descriptive statements into voice to play, so that the young children can learn image content in combination with the images and the voice.

For another example, for a lot of images stored in a database, the image recognition method provided in the embodiments of this application may be used to translate images into corresponding descriptive statements, so as to accurately classify the images according to the descriptive statements of the images, or accurately retrieve the images according to the descriptive statements of the images.

For another example, for an image to be recognized by a blind person, the image may be first translated into a corresponding descriptive statement, and then the descriptive statement is transformed into voice to play, so that the blind person recognizes the image by using the heard voice, or transforms the descriptive statement into Braille for the blind person to recognize the image by reading the Braille.

For another example, in a chatting system, an image in a chatting window may be translated into a corresponding descriptive statement, and the descriptive statement is displayed.

Only the foregoing several application scenarios are used as examples for description in the embodiments of this application, but in actual application, the image recognition method provided in the embodiments of this application may be further applied to other scenarios, which are not listed herein in the embodiments of this application.

Next, a system architecture involved in the embodiments of this application is described.

Figure 3:
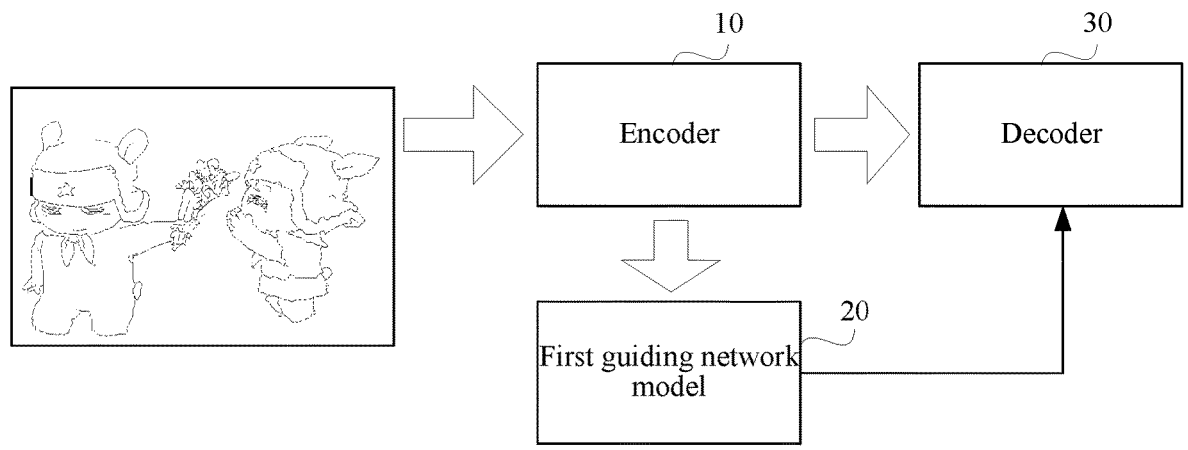
FIG. 3 is a schematic structural diagram of an image recognition system according to an embodiment of this application.

FIG. 3 is a schematic structural diagram of an image recognition system according to an embodiment of this application. As shown in FIG. 3, the image recognition system includes an encoder 10, a first guiding network model 20, and a decoder 30.

The encoder 10 is configured to encode a to-be-recognized target image, that is, perform feature extraction on the target image, to obtain a feature vector and a first annotation vector set. The feature vector is used for indicating a global feature of the target image, and the first annotation vector set is used for indicating a local feature of the target image.

The encoder 10 may output the first annotation vector set to the decoder 30 and the first guiding network model 20 respectively. The encoder 10 may perform initialization processing on the feature vector, to obtain first initial input data, and then output the first initial input data to the decoder 30; or the encoder 10 may output the feature vector to another model, and the another model performs initialization processing on the feature vector outputted by the target encoder (e.g., encoder 10), to obtain first initial input data, and outputs the first initial input data to the decoder 30.

The first guiding network model 20 is configured to generate first guiding information based on the first annotation vector set outputted by the encoder 10, and then output the first guiding information to the decoder 30, and the first guiding network model is obtained through training by using an annotation vector set of a sample image.

The decoder 30 is configured to determine a descriptive statement of the target image based on the first guiding information, the first annotation vector set, and the first initial input data.

As can be known from the foregoing, compared with the related technology, in the image recognition system shown in FIG. 3, a guiding network model is added between the encoder and the decoder. Because the guiding network model can generate, according to an annotation vector set of any image, a descriptive statement of the image, compared with artificially designed guiding information, guiding information generated by using the guiding network model can be more suitable for a generation process of the descriptive statement of the target image and has higher accuracy, to accurately guiding an encoding process of the image, thereby improving quality of the generated descriptive statement.

Figure 4:
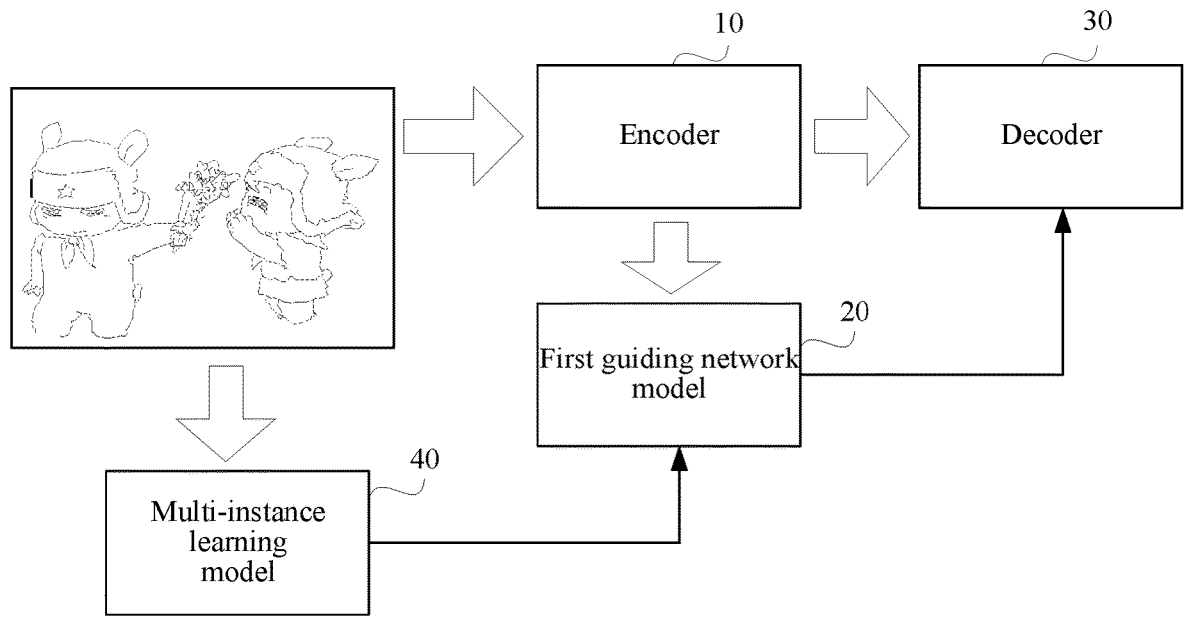
FIG. 4 is a schematic structural diagram of another image recognition system according to an embodiment of this application.

FIG. 4 is a schematic structural diagram of another image recognition system according to an embodiment of this application. As shown in FIG. 4, the image recognition system includes an encoder 10, a first guiding network model 20, a decoder 30, and a multi-instance model 40 (e.g., multi-instance learning model).

The encoder 10 and the decoder 30 in FIG. 4 have the same functions as those in FIG. 3. For specific description, reference may be made to FIG. 3. Details are not described herein again.

The multi-instance model 40 is configured to process the to-be-recognized target image, to obtain attribute information of the target image, the attribute information being used for indicating a probability of a predicted word in the descriptive statement of the target image, and output the attribute information of the target image to the first guiding network model 20.

The first guiding network model 20 is configured to generate first guiding information based on the first annotation vector set outputted by the encoder 10 and the attribute information of the target image outputted by the multi-instance model 40.

In FIG. 4, the multi-instance model 40 is added prior to the first guiding network model 20, so that the first guiding network model 20 may determine the first guiding information according to the first annotation vector set and the attribute information of the target image comprehensively, thereby further improving accuracy of the generated first guiding information.

Figure 5:
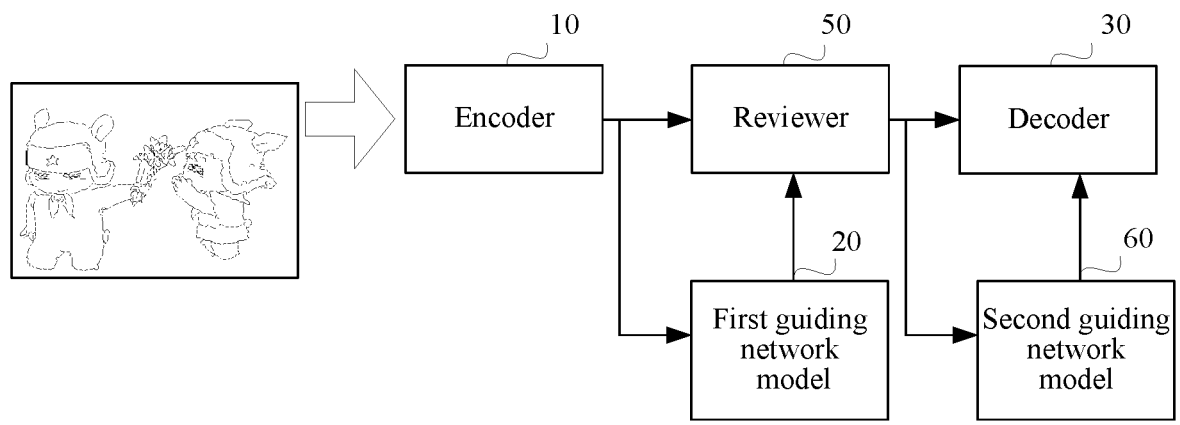
FIG. 5 is a schematic structural diagram of still another image recognition system according to an embodiment of this application.

FIG. 5 is a schematic structural diagram of still another image recognition system according to an embodiment of this application. As shown in FIG. 5, the image recognition system includes an encoder 10, a first guiding network model 20, a reviewer 50, a second guiding network model 60, and a decoder 30.

The encoder 10 in FIG. 5 has the same function as that in FIG. 3. For specific description, reference may be made to FIG. 3. Details are not described herein again.

The first guiding network model 20 is configured to generate first guiding information based on the first annotation vector set inputted by the encoder 10, and output the first guiding information to the reviewer 50.

The reviewer 50 is configured to determine a second annotation vector set and second initial input data based on the first initial input data, the first annotation vector set, and the first guiding information, output the second annotation vector set and the second initial input data to the decoder 30, and output the second annotation vector set to the second guiding network model 60. The second initial input data is initial input data of the decoder 30, is used for indicating an initial state of the decoder 30, and may specifically include initial hidden state information and initial memory cell state information.

The second guiding network model 60 is configured to generate second guiding information based on the second annotation vector set, and output the second guiding information to the decoder 30, and the second guiding network model is also obtained through training by using a sample image.

The decoder 30 is configured to decode the second annotation vector set and the second initial input data based on the second guiding information, to obtain a descriptive statement of the target image.

In FIG. 5, the reviewer is added between the encoder and the decoder, and an interactive relationship between a local feature and a global feature of the target image may further be dug by using the reviewer, so that the generated second annotation vector set and second initial input data can more accurately indicate the features of the target image, to further improve system performance of the image recognition system, thereby improving quality of the generated descriptive statement.

Figure 6:
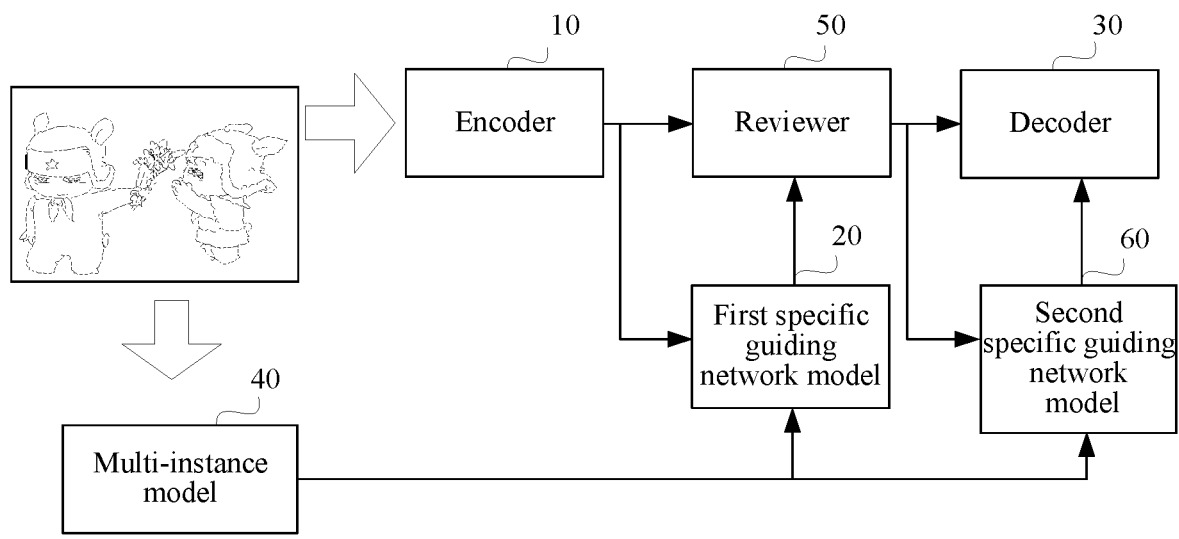
FIG. 6 is a schematic structural diagram of yet another image recognition system according to an embodiment of this application.

FIG. 6 is a schematic structural diagram of yet another image recognition system according to an embodiment of this application. As shown in FIG. 6, the image recognition system includes an encoder 10, a first guiding network model 20, a reviewer 50, a second guiding network model 60, a decoder 30, and a multi-instance model 40.

The encoder 10, the reviewer 50, and the decoder 30 in FIG. 6 have the same functions as those in FIG. 5. For specific description, reference may be made to FIG. 5. Details are not described herein again.

The multi-instance model 40 is configured to process the to-be-recognized target image, to obtain attribute information of the target image, and output the attribute information of the target image to the first guiding network model 20 and the second guiding network model 60 respectively.

The first guiding network model 20 is configured to generate first guiding information based on the first annotation vector set outputted by the encoder 10 and the attribute information of the target image outputted by the multi-instance model 40, and output the first guiding information to the reviewer 50.

The second guiding network model 60 is configured to generate second guiding information based on the second annotation vector set outputted by the reviewer 50 and the attribute information of the target image outputted by the multi-instance model 40, and output the second guiding information to the decoder 30, so that the encoder 30 encodes the second annotation vector set and the second initial input data based on the second guiding information, to obtain a descriptive statement of the target image.

In FIG. 6, a multi-instance model 40 is added prior to the first guiding network model 20 and the second guiding network model 60, so that both the first guiding network model 20 and the second guiding network model 60 may determine guiding information according to the attribute information of the target image and the annotation vector set comprehensively, thereby further improving accuracy of the generated guiding information.

The image recognition systems shown in FIG. 3 to FIG. 6 may all be obtained through training based on a plurality of sample images and descriptive statements of the plurality of sample images, that is, the encoder, the first guiding network model, the reviewer, the second guiding network model, and the decoder may be obtained through training, so that the first guiding network model and the second guiding network model may adaptively learn how to generate accurate guiding information in a training process, thereby improving accuracy of the generated guiding information.

Figure 7:
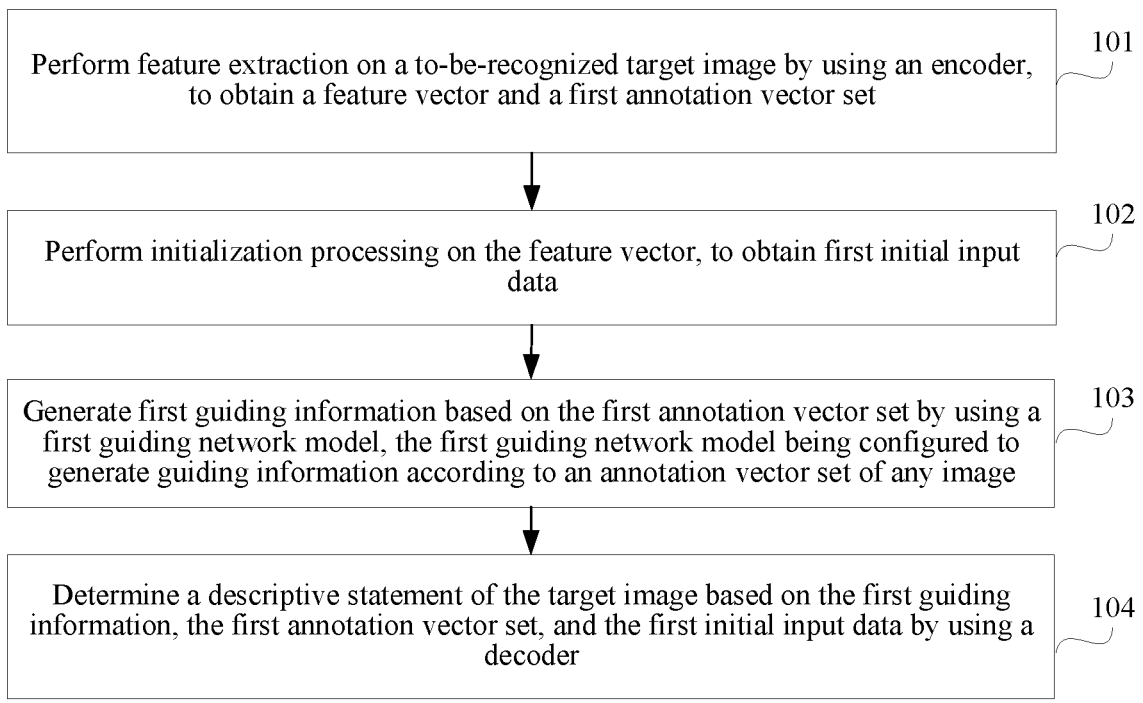
FIG. 7 is a flowchart of an image recognition method according to an embodiment of this application.

Next, the image recognition method provided in the embodiments of this application is described in detail with reference to the schematic structural diagrams of the image recognition systems shown in the foregoing FIG. 3 to FIG. 6. FIG. 7 is a flowchart of an image recognition method according to an embodiment of this application. The method may be performed by a terminal. The terminal may be a mobile phone, a PAD, or a computer. The terminal may include the foregoing image recognition system, for example, may carry the foregoing image recognition system by using installed software. Referring to FIG. 7, the method includes:

Step 101: Perform feature extraction on a to-be-recognized target image by using an encoder, to obtain a feature vector and a first annotation vector set.

When the to-be-recognized target image is recognized, the target image may be first input to the encoder, and feature extraction is performed on the target image by using the encoder, to respectively obtain the feature vector and the first annotation vector set of the target image.

Specifically, global feature extraction may be performed on the target image by using the encoder, to obtain the feature vector, and local feature extraction may be performed on the target image by using the encoder, to obtain the annotation vector set. The feature vector is used for indicating a global feature of the target image, and an annotation vector in a second identification vector set is used for indicating a local feature of the target image.

Optionally, the encoder may use a CNN model. When the encoder performs feature extraction on the target image by using the CNN model, the feature vector may be extracted by using the last fully connected layer of the CNN model, and the second annotation vector set may be extracted by using the last convolutional layer of the CNN model.

Step 102: Perform initialization processing on the feature vector, to obtain first initial input data.

The first initial input data refers to initial input data to be input to a next processing model of the encoder, and is used for indicating an initial state of the next processing model. The next processing model may be a decoder or a reviewer. The first initial input data may include first initial hidden state information and first initial memory cell state information. The first initial hidden state information is used for indicating an initial state of a hidden layer of the next processing model, and the first initial memory cell state information is used for indicating an initial state of a memory cell of the next processing model.

Specifically, initialization processing such as linear transformation may be performed on the feature vector, to obtain the first initial input data. Moreover, initialization processing may be performed on the feature vector by using the encoder, to obtain the first initial input data, or initialization processing may be performed on the feature vector outputted by the encoder by using another model, to obtain the first initial input data. This is not limited in this embodiment of this application.

For example, the encoder may include an RNN model and an initialization model. The RNN model is configured to perform feature extraction on the target image, and the initialization model is configured to perform initialization processing on the feature vector. After performing feature extraction on the image by using the RNN model, to obtain the feature vector, the encoder may perform initialization processing on the feature vector by using the initialization model, to obtain the first initial input data.

Alternatively, the encoder may also be configured to only perform feature extraction on the target image, and an initialization model is added posterior to the encoder. The initialization model is configured to perform initialization processing on the feature vector. After feature extraction is performed on the target image by using the encoder, to obtain the feature vector, the feature vector may be output to the initialization model, and then initialization processing is performed on the feature vector by using the initialization model, to obtain the first initial input data.

Step 103: Generate first guiding information based on the first annotation vector set by using a first guiding network model, the first guiding network model being configured to generate guiding information according to an annotation vector set of any image.

Specifically, the generating first guiding information based on the first annotation vector set by using a first guiding network model may include the following two implementations:

A first implementation: performing linear transformation on the first annotation vector set based on a first matrix constructed by model parameters in the first guiding network model, to obtain a second matrix; and determining the first guiding information based on a maximum value of each row in the second matrix.

The first guiding network model may be obtained through training according to an annotation vector set of a sample image. In an embodiment, models in FIG. 3 may be transformed into to-be-trained models, and then a transformed image recognition system is trained based on a plurality of sample images and descriptive statements of the plurality of sample images. In a training process, a to-be-trained encoder may extract annotation vectors from the plurality of sample images respectively, and output the annotation vectors to a to-be-trained guiding network model for training. In this way, after the entire image recognition system is trained completely, the to-be-trained guiding network model may be trained as the first guiding network model.

The to-be-trained encoder may be an untrained encoder, or may be a pre-trained encoder. This is not limited in this embodiment of this application. Training the to-be-trained guiding network model by using the pre-trained encoder can improve training efficiency of the entire image recognition system, thereby improving training efficiency of the to-be-trained guiding network model.

The first annotation vector set is also in a matrix form, and the first matrix is a matrix that is constructed by model parameters in the first guiding network model and that is configured to perform linear transformation on the first annotation vector set. Specifically, the first annotation vector set may be multiplied by the first matrix, to perform linear transformation on the first annotation vector set, to obtain the second matrix.

Specifically, the determining the first guiding information based on a maximum value of each row in a second matrix includes: selecting a maximum value of each row in the second matrix, then forming the selected maximum values into a matrix with one column according to a rule of not changing rows, and determining the formed matrix as the first guiding information.

For example, assuming that the first annotation vector set is $A=[a_1, a_2, \ldots, a_k]$, $a_1$-$a_k$ are annotation vectors extracted from the target image, the first matrix is $P_1$, and the first guiding information is v, the first guiding information may be determined by using the following formula (1):

$$v = \max([P_1 a_1, \ldots, P_1 a_2, \ldots, P_1 a_k]) \qquad (1)$$

where the max function refers to taking a maximum value of each row of a to-be-processed matrix, and forming a matrix with unchanged rows and one column.

A second implementation: When the first guiding network model is configured to generate guiding information according to an annotation vector set and attribute information of any image, the target image may be used as an input of a multi-instance model, and the target image may be processed by using the multi-instance model, to obtain the attribute information of the target image; linear transformation may be performed on the first annotation vector set based on a third matrix constructed by model parameters in the first guiding network model, to obtain a fourth matrix; a fifth matrix may be generated based on the fourth matrix and the attribute information of the target image; and the first guiding information may be determined based on a maximum value of each row in the fifth matrix. Attribute information of a sample image is used for indicating a probability of a predicted word in a descriptive statement of the sample image The multi-instance model is a model that is obtained through training by using a plurality of sample images and descriptive statements of the plurality of sample images, and that can output attribute information of the sample images. That is, the multi-instance model can predict a probability of possible words in the descriptive statements of the images. For example, the attribute information may be multi-instance learning (MIL) information or the like.

The first guiding network model may be obtained through training by using the annotation vector set and the attribute information of the sample image. For example, models in FIG. 4 may be transformed into a to-be-trained model, and then a transformed image recognition system is trained based on a plurality of sample images and descriptive statements of the plurality of sample images. In a training process, a to-be-trained encoder may extract annotation vectors from the sample images and output the annotation vectors to a to-be-trained guiding network model, and the to-be-trained multi-instance model may process the images to obtain attribute information, and output the attribute information to the to-be-trained guiding network model, so that the to-be-trained guiding network model may be trained based on the annotation vectors of the sample images and the attribute information. In this way, after the entire image recognition system is trained completely, the to-be-trained guiding network model may be trained as the first guiding network model.

The to-be-trained encoder may be an untrained encoder, or may be a pre-trained encoder. The to-be-trained multi-instance model may be an untrained multi-instance model, or may be a pre-trained multi-instance model. This is not limited in this embodiment of this application. Training the to-be-trained guiding network model by using the pre-trained encoder and/or the pre-trained multi-instance model can improve training efficiency of the entire image recognition system, thereby improving training efficiency of the to-be-trained guiding network model.

The first annotation vector set is also in a matrix form, and the third matrix is a matrix that is constructed by model parameters of the first guiding network model and that is configured to perform linear transformation on the first annotation vector set. Specifically, the first annotation vector set may be multiplied by the third matrix, to perform linear transformation on the first annotation vector set, to obtain a fourth matrix, and then a fifth matrix is generated based on the fourth matrix and the attribute information of the target image.

The determining the first guiding information based on a maximum value of each row in a fifth matrix includes: selecting a maximum value of each row in the fifth matrix, then forming the selected maximum values into a matrix with one column according to a rule of not changing rows, and determining the formed matrix as the first guiding information.

Specifically, assuming that the first annotation vector set is $A=[a_1, a_2, \ldots, a_k]$, $a_1$-$a_k$ are annotation vectors extracted from the target image, the third matrix is $P_2$, the attribute information of the target image is e, and the first guiding information is v, the first guiding information v may be determined by using the following formula (2):

$$v=\max([e, P_2 a_1, P_2 a_2, \ldots, P_2 a_k]) \qquad (2)$$

where the max function refers to taking a maximum value of each row of a to-be-processed matrix, and forming a matrix with unchanged rows and one column.

Ac can be known from the foregoing, the first guiding network model may be obtained through learning, that is, may be obtained through training by using a plurality of sample images and descriptive statements of the plurality of sample images, and guiding information may be automatically learned in a training process. Therefore, first guiding information generated by using the first guiding network model has higher accuracy, and the generated first guiding information can accurately guiding an encoding process of the encoder, thereby improving quality of a generated descriptive statement of the target image.

Step 104: Determine a descriptive statement of the target image based on the first guiding information, the first annotation vector set, and the first initial input data by using a decoder.

In some embodiments of this application, the determining a descriptive statement of the target image based on the first guiding information, the first annotation vector set, and the first initial input data by using a decoder may include the following two implementations:

A first implementation: decoding the first annotation vector set and the first initial input data based on the first guiding information by using the decoder, to obtain the descriptive statement of the target image.

Optionally, the decoder usually uses an RNN model, for example, may use an LSTM network model.

Specifically, the decoding the first annotation vector set and the first initial input data based on the first guiding information by using the decoder, to obtain the descriptive statement of the target image may include the following steps 1) to 3):

1) In a case that the decoder uses a first RNN model, and the first RNN model is configured to perform M sequential steps, for each of the M sequential steps (each of the M sequential steps may also be referred to as first sequential step) performed by the first RNN model, determine input data of the first sequential step based on the first guiding information.

M is a quantity of times of circularly processing the input data by the first RNN model, M is a positive integer, and each first sequential step is a processing step of the first RNN model for the input data.

The determining input data of the first/current sequential step based on the first guiding information may include determining the input data of the first sequential step based on the first guiding information by using the following formula (3):

$$x_t = E y_t + Q v \qquad (3)$$

where t is the first/current sequential step, $x_t$ is the input data of the first sequential step, E is a word embedding matrix and is a model parameter of the first RNN model, $y_t$ is an one-hot vector of words corresponding to the first sequential step, where the words corresponding to the first sequential step are obtained through determining based on output data of a previous first sequential step of the first sequential step, Q is a sixth matrix and is a model parameter of the first RNN model, and v is the first guiding information.

2) Determine output data of the first sequential step based on the input data of the first sequential step, the first annotation vector set, and output data of a previous first sequential step of the first sequential step.

In some embodiments of this application, the input data of the first/current sequential step, the first annotation vector set, and the output data of the previous sequential step of the current sequential step may be processed by using the first RNN model, to obtain the output data of the first sequential step.

The output data of the current sequential step may include hidden state information and memory cell state information. Moreover, when the current sequential step is placed as the first sequential step in the M sequential steps, the output data of the previous sequential step of the current sequential step is obtained through determining based on the first initial input data. For example, when the first initial input data includes first initial hidden state information $h_0$ and first initial memory cell state information $c_0$, and the current sequential step is the first sequential step of the M steps, the output data of the previous sequential step of the first sequential step is $h_0$ and $c_0$.

In some embodiments of this application, to improve quality of the generated descriptive statement, the used first RNN model may be an LSTM network model. By using the LSTM network model as an example, the determining output data of the first sequential step based on the input data of the first sequential step, the first annotation vector set, and output data of a previous sequential step of the current sequential step may be abstractly represented as the following formula (4):

$$h_t = \text{LSTM}(x_t, h_{t-1}, A) \tag{4}$$

where t is the first sequential step, $x_t$ is the input data of the first sequential step, $h_{t-1}$ is hidden state information of a previous sequential step of the first sequential step, A is the first annotation vector set, $h_t$ is hidden state information of the first sequential step, and LSTM represents a processing process of the LSTM network model.

Specifically, the processing process of the LSTM network model may be represented by using the following formula:

$$\begin{cases} \begin{pmatrix} i_t \\ f_t \\ o_t \\ g_t \end{pmatrix} = \begin{pmatrix} \sigma \\ \sigma \\ \sigma \\ \tanh \end{pmatrix} T \begin{pmatrix} x_t \\ h_{t-1} \\ d_t \end{pmatrix} \\ c_t = f_t \odot c_{t-1} + i_t \odot g_t \\ h_t = o_t \odot \tanh(c_t) \end{cases} \tag{5}$$

where $i_t$, $f_t$, $c_t$, and $o_t$ are output data of the first sequential step in an input gate, a forget gate, a memory gate, and an output gate respectively, $\sigma$ is an activation function of the LSTM network model, such as a sigmoid function, tan h ( ) is a hyperbolic tangent function, T is a matrix used for linear transformation, $x_t$ is the input data of the first sequential step, $h_{t-1}$ is hidden state information of a previous sequential step of the first sequential step, $d_t$ is target data obtained through determining based on the first annotation vector set, $c_t$ is memory cell state information of the first sequential step, $c_{t-1}$ is memory cell state information of a previous sequential step of the current sequential step, and $h_t$ is hidden state information of the first sequential step.

The target data $d_t$ may be a first annotation vector set, or may be a context vector. The context vector is hidden state information based on the first annotation vector set and the previous sequential step of the first sequential step, and is obtained through determining by using an attention model.

The attention model may be configured to determine which region of the target image the previous sequential step pays attention to, that is, may calculate a weight for each annotation vector in A, and a higher weight of the annotation vector indicates that more attention is paid to the annotation vector.

In a possible implementation, the LSTM network model may be an LSTM network model disposed with an attention model. After the first annotation vector set and the hidden state information of the previous sequential step of the first sequential step are obtained, a context vector may be determined based on the first annotation vector set and the hidden state information of the previous sequential step of the first sequential step by using the attention model, and the context vector is used as the target data.

Specifically, the attention model may calculate a similarity $e_i$ between any annotation vector $a_i$ in $\mathcal{A}$ and $h_{t-1}$, then calculate a weight $$w_i = \frac{\exp(a_i)}{\sum_j \exp(a_j)}$$

of attention of $a_i$, and next, generate a context vector $z_t = \Sigma w_i a_i$ by using the weight of each annotation vector.

3) Determine the descriptive statement of the target image based on all output data of the M first sequential steps.

Specifically, output data of all first sequential steps in the M first sequential steps may be combined, to obtain the descriptive statement of the target image. In actual application, output data of each first sequential step is usually a word, and then M words outputted by the M first sequential step s may be combined, to obtain the descriptive statement of the target image.

Using the target image shown in FIG. 3 as an example, if all output data of the M first sequential steps may be boy, to, girl, present, and flowers respectively, the descriptive statement of the target image is "A boy presents flowers to a girl".

Further, to accurately generate the first guiding network model of the guiding information based on the annotation vector set of the target image, before feature extraction is performed on the target image by using the encoder, to obtain the feature vector and the first annotation vector set, a first to-be-trained encoder, a first to-be-trained guiding network model, and a first to-be-trained decoder may be combined, to obtain a first cascaded network model, and then the first cascaded network model may be trained based on a plurality of sample images and descriptive statements of the plurality of sample images by using a gradient descent method, to obtain the encoder, the first guiding network model, and the decoder That is, the first to-be-trained encoder, the first to-be-trained guiding network model, and the first to-be-trained decoder may be first constructed in a connection manner of FIG. 3 or FIG. 4 as an image recognition system that can process an image, to obtain a descriptive statement of the image, and then the image recognition system is trained based on a plurality of sample images and descriptive statements of the plurality of sample images. In a training process of the image recognition system, the first to-be-trained guiding network model may be trained, so that the first to-be-trained guiding network model can adaptively learn guiding information in the training process to ensure that the generated guiding information can be increasingly accurate.

In a training process of the first to-be-trained guiding network model, a multi-label margin loss function may be used as a loss function of the first to-be-trained guiding network model, and model parameters of the first to-be-trained guiding network model are adjusted based on the loss function by using a random gradient descent method, to obtain the first guiding network model.

In actual training, an annotated training set may be used to perform training, the training set is a set of a pair of <sample image, descriptive statement>, such as an MSCOCO data set (a common data set).

The first to-be-trained encoder may be an untrained encoder, or may be a pre-trained encoder. This is not limited in this embodiment of this application. For example, the first to-be-trained encoder may use a CNN model pre-trained on the ImageNet (a computer visual system recognition project name, which is the current largest image recognition database in the world). The CNN model may be an inception V3 model (a CNN model), a Resnet model (a CNN model), or a VGG model (a CNN model), or the like.

Training the first guiding network model by using the pre-trained encoder as the first to-be-trained encoder can improve training efficiency of the entire first cascaded network mode, thereby improving training efficiency of the first guiding network model.

In some embodiments of this application, a process of recognizing the target image to obtain the descriptive statement of the target image and a process of training the guiding network model may be performed on the same terminal or may be performed on different terminals, which is not limited in this embodiment of this application.

A second implementation is: determining a second annotation vector set and second initial input data based on the first guiding information, the first annotation vector set, and the first initial input data by using a reviewer; generating second guiding information based on the second annotation vector set by using a second guiding network model; and encoding the second annotation vector set and the second initial input data based on the second guiding information by using the encoder, to obtain the descriptive statement of the target image.

The second implementation is described in detail in the following embodiment of FIG. 8, and is not described herein again in this embodiment of this application.

In some embodiments of this application, a guiding network model is added between an encoder and a decoder, and after an annotation vector set is extracted from an image, guiding information may be generated based on the annotation vector set by using the guiding network model. Because the guiding network model is obtained through training by an annotation vector set of a sample image, how to accurately generate the guiding information may be adaptively learned in a training process according to the annotation vector set of the image. Therefore, the guiding information generated by using the guiding network model has higher accuracy, and can accurately guiding an encoding process of the image, thereby improving quality of a generated descriptive statement.

Next, an image recognition method provided in the embodiments of this application is described in detail with reference to the schematic structural diagrams of the image recognition systems shown in the foregoing FIG. 5 and FIG. 6. FIG. 8 is a flowchart of another image recognition method according to an embodiment of this application. The method is applied to a terminal. Referring to FIG. 8, the method includes:

Step 201: Perform feature extraction on a to-be-recognized target image by using an encoder, to obtain a feature vector and a first annotation vector set.

Step 202: Perform initialization processing on the feature vector, to obtain first initial input data.

Step 203: Generate first guiding information based on the first annotation vector set by using a first guiding network model.

For specific implementations of step 201 to step 203, reference may be made to the related description of step 101 to step 103. This is not described herein again in this embodiment of the application.

Step 204: Determine a second annotation vector set and second initial input data based on the first guiding information, the first annotation vector set, and the first initial input data by using a reviewer.

In some embodiments of this application, both a decoder and the reviewer usually use an RNN model, or certainly may use other models. This is not limited in this embodiment of this application.

The reviewer is configured to further dig an interactive relationship between a global feature and a local feature extracted from an image by the encoder, and generate initial input data for the decoder based on the interactive relationship between the global feature and the local feature, that is, the second initial input data, to improve performance of the decoder, thereby improving quality of a generated descriptive statement.

The first initial input data refers to input data to be input to the reviewer, is used for indicating an initial state of the reviewer, and may specifically include first initial hidden state information and first initial memory cell state information. The first initial hidden state information is used for indicating an initial state of a hidden layer of the reviewer, and the first initial memory cell state information is used for indicating an initial state of a memory cell of the reviewer.

The second initial input data refers to input data to be input to the decoder, is used for indicating an initial state of the decoder, and may specifically include second initial hidden state information and second initial memory cell state information. The second initial hidden state information is used for indicating an initial state of a hidden layer of the decoder, and the second initial memory cell state information used for indicating an initial state of a memory cell of the decoder.

Specifically, the determining a second annotation vector set and second initial input data based on the first guiding information, the first annotation vector set, and the first initial input data by using a reviewer may include the following step 1) to 3):

1) Determine, in a case that the first reviewer uses a second RNN model, and the second RNN model is configured to perform N sequential steps, for each of the N sequential steps (each of the N sequential steps may also be referred as second sequential step) performed by the second RNN model, input data of a present sequential step based on the first guiding information.

N is a quantity of times of circularly processing the input data by the second RNN model, N is a positive integer, and each second sequential step is a processing step of the second RNN model for the input data.

Specifically, the input data of the second/present sequential step may be determined based on the second guiding information by using the following formula (6):

$$x'_t = E'y'_t + Q'v' \qquad (6)$$

where t is the second/present sequential step, $x'_t$ is the input data of the second sequential step, E' is a word embedding matrix and is a model parameter of the second RNN model, Q' is a seventh matrix and is a model parameter of the second RNN model, and v' is the second guiding information.

2) Determine output data of the second/present sequential step based on the input data of the second/present sequential step, the first annotation vector set, and output data of a previous sequential step of the present sequential step.

The output data of the present sequential step may include hidden state information and memory cell state information, and when the present sequential step is the first step in the N sequential steps, the output data of the previous sequential step of the present sequential step is obtained through determining based on the first initial input data.

In some embodiments of this application, the input data of the second sequential step, the second annotation vector set, and the output data of the previous sequential step of the present sequential step may be processed by using the second RNN model, to obtain the output data of the second sequential step.

Specifically, the output data of the second sequential step may be determined based on the input data of the second sequential step, the first annotation vector set, and the output data of the previous sequential step according to the foregoing method for determining output data of the first sequential step based on the input data of the first sequential step, the first annotation vector set, and output data of a previous sequential step of the current sequential step. For a specific implementation, reference may be made to the foregoing related description. Details are not described herein again.

3) Determine the second initial input data based on output data of the last second sequential step in the N second sequential steps.

Specifically, the output data of the last second sequential step may be determined as the second initial input data. For example, hidden state information and memory cell state information of the last second sequential step may be determined as the second initial input data, that is, initial hidden state information and initial memory cell state information of the target encoder are determined.

4) Determine the second annotation vector set based on all output data of the N second sequential steps.

Specifically, a set of hidden state information of all sequential steps in the N second sequential step s is determine as the second annotation vector set.

Step 205: Generate second guiding information based on the second annotation vector set by using a second guiding network model, where the second guiding network model is configured to generate guiding information according to the annotation vector set.

Specifically, the second guiding information may be generated based on the second annotation vector set by using the second guiding network model according to the method for generating first guiding information based on the first annotation vector set by using a first guiding network model in step 103 in the foregoing embodiment of FIG. 7. For a specific implementation, reference may be made to the related description of the foregoing step 103. Details are not described herein again.

The second guiding network model may be obtained through training by using the sample image together with the first guiding network model, and guiding information may be automatically learned in a training process. Therefore, the guiding information generated by using the first guiding network model and the second guiding network model has higher accuracy. The generated guiding information can accurately guiding an encoding process of the encoder, thereby improving quality of the generated descriptive statement of the target image.

Step 206: Encode the second annotation vector set and the second initial input data based on the second guiding information by using the encoder, to obtain the descriptive statement of the target image.

Specifically, the second annotation vector set and the second initial input data may be encoded based on the second guiding information by using the encoder according to the method for decoding the first annotation vector set and the first initial input data based on the first guiding information by using the decoder, to obtain the descriptive statement of the target image in step 104 in the embodiment of the foregoing FIG. 7, to obtain the descriptive statement of the target image. For a specific implementation, reference may be made to related description of the first implementation in the foregoing step 104. Details are not described herein again.

Further, to obtain the first guiding network model that can accurately generate the first guiding information based on the first annotation vector set of the target image, and the second guiding network model that can accurately generate the second guiding information based on the second annotation vector set, before the performing feature extraction on a target image by using an encoder, to obtain a feature vector and a first annotation vector set, a second to-be-trained encoder, a second to-be-trained guiding network model, a to-be-trained reviewer, a third to-be-trained guiding network model, and a second to-be-trained decoder may be further combined, to obtain a second cascaded network model, and then the second cascaded network model is trained based on a plurality of sample images and descriptive statements of the plurality of sample images by using a gradient descent method, to obtain the encoder, the first guiding network model, the reviewer, the second guiding network model, and the decoder.

That is, the second to-be-trained encoder, the second to-be-trained guiding network model, the to-be-trained reviewer, the third to-be-trained guiding network model, and the second to-be-trained decoder may be first constructed according to a connection manner of FIG. 5 as an image recognition system that can process an image, to obtain a descriptive statement of the image, and then the image recognition system is trained based on a plurality of sample images and descriptive statements of the plurality of sample images. In a training process of the image recognition system, the second to-be-trained guiding network model and the third to-be-trained guiding network model may be trained, so that the second to-be-trained guiding network model and the third to-be-trained guiding network model can adaptively learn guiding information in the training process, to ensure that the generated guiding information can be increasingly accurate.

The second to-be-trained encoder may be an untrained encoder, or may be a pre-trained encoder. The to-be-trained reviewer may be an untrained reviewer, or may be a pre-trained reviewer. This is not limited in this embodiment of this application.

Training the first guiding network model and the second guiding network model by using the pre-trained encoder as the second to-be-trained encoder, or using the pre-trained reviewer as the to-be-trained reviewer can improve training efficiency of the entire second cascaded network model, thereby improving training efficiency of the first guiding network model and the second guiding network model.

Further in some embodiments of this application, a process of recognizing a target image, to obtain a descriptive statement of the target image and a process of training a guiding network model may be performed on the same terminal or may be performed on different terminals. This is not limited in this embodiment of this application.

In some embodiments of this application, a guiding network model is added between an encoder and a decoder, and after an annotation vector set is extracted from an image, guiding information may be generated based on the annotation vector set by using the guiding network model. Because the guiding network model is obtained through training by using a sample image, the guiding network model may adaptively learn the guiding information in a training process. Therefore, the guiding information generated by using the guiding network model has higher accuracy, and can accurately guiding an encoding process of the image, thereby improving quality of a generated descriptive statement.

Further, a reviewer is added between the encoder and the decoder, and an interactive relationship between a local feature and a global feature of a target image may further be dug by using the reviewer, so that the generated second annotation vector set and second initial input data can more accurately indicate the features of the target image, to further improve system performance of the image recognition system, thereby improving quality of the generated descriptive statement.

Figure 9:
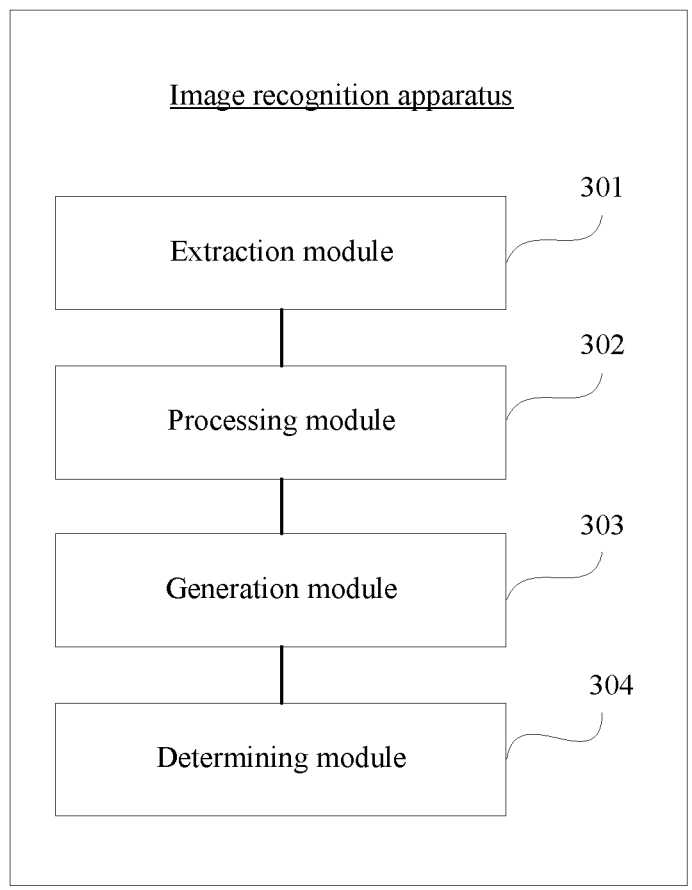
FIG. 9 is a schematic structural diagram of an image recognition apparatus according to an embodiment of this application.

FIG. 9 is a schematic structural diagram of an image recognition apparatus according to an embodiment of this application. The apparatus may be a terminal. Referring to FIG. 9, the apparatus includes:

an extraction module 301, configured to perform feature extraction on a to-be-recognized target image by using an encoder, to obtain a feature vector and a first annotation vector set;

a processing module 302, configured to perform initialization on the feature vector, to obtain first initial input data;

a generation module 303, configured to generate first guiding information based on the first annotation vector set by using a first guiding network model, the first guiding network model being configured to generate guiding information according to an annotation vector set of any image; and a determining module 304, configured to determine a descriptive statement of the target image based on the first guiding information, the first annotation vector set, and the first initial input data by using a decoder.

Figure 10:
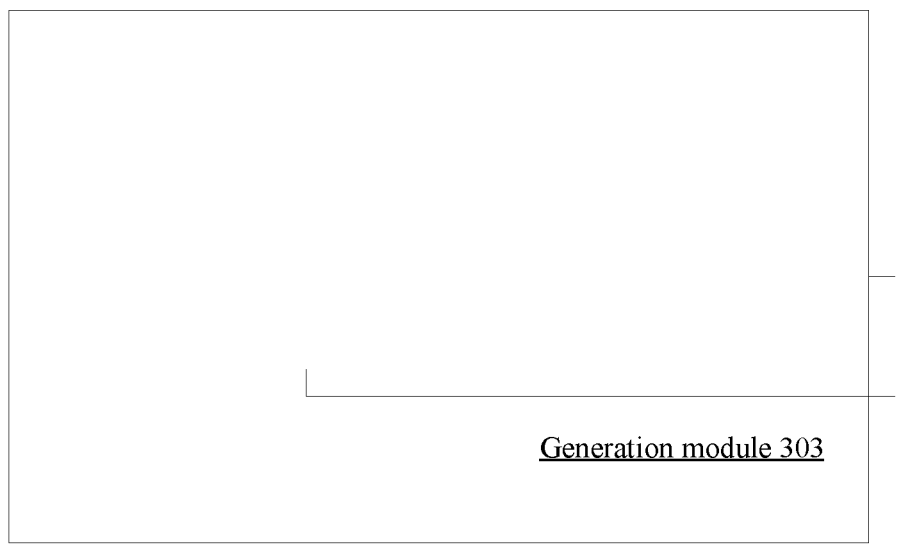
FIG. 10 is a schematic structural diagram of a generation module 303 according to an embodiment of this application.

Optionally, referring to FIG. 10, the generation module 303 includes:

a first linear transformation unit 3031, configured to perform linear transformation on the first annotation vector set based on a first matrix constructed by model parameters in the first guiding network model, to obtain a second matrix; and a first determining unit 3032, configured to determine the first guiding information based on a maximum value of each row in the second matrix.

Figure 11:
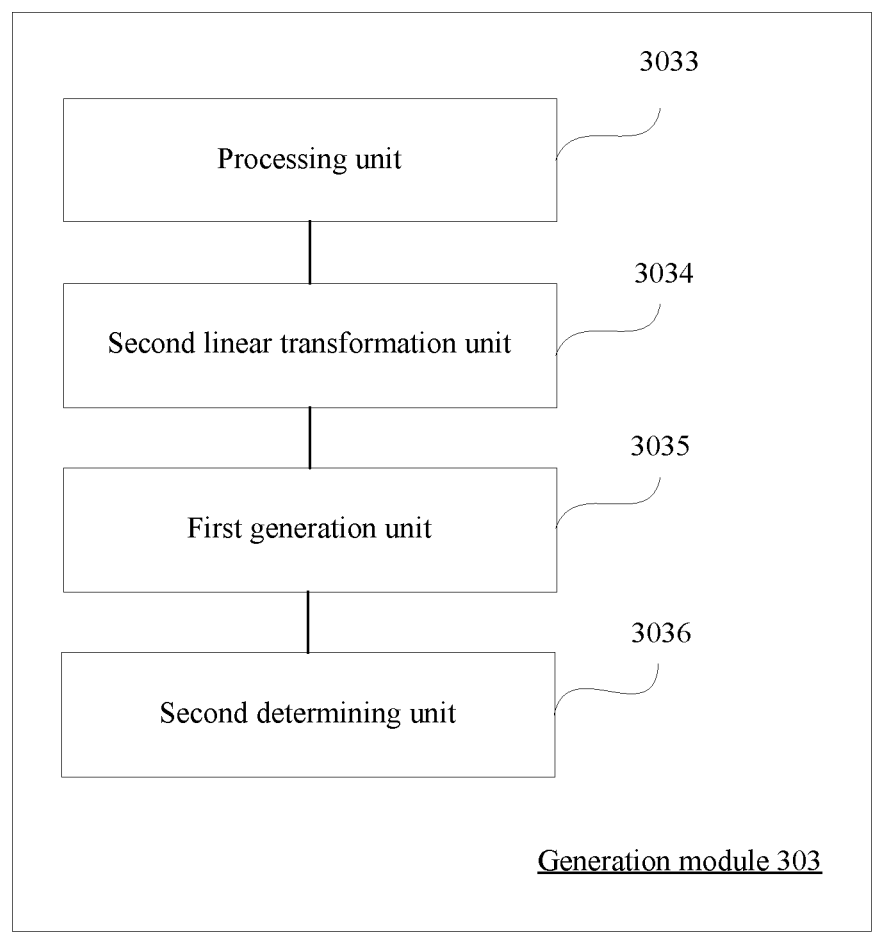
FIG. 11 is a schematic structural diagram of another generation module 303 according to an embodiment of this application.

Optionally, referring to FIG. 11, the first guiding network model is configured to generate guiding information according to an annotation vector set and attribute information of any image, and the attribute information is used for indicating a probability of a predicted word in a descriptive statement of the image; and the generation module 303 includes:

a processing unit 3033, configured to use the target image as an input of a multi-instance model, and process the target image by using the multi-instance model, to obtain attribute information of the target image;

a second linear transformation unit 3034, configured to perform linear transformation on the first annotation vector set based on a third matrix constructed by model parameters in the first guiding network model, to obtain a fourth matrix;

a first generation unit 3035, configured to generate a fifth matrix based on the fourth matrix and the attribute information of the target image; and a second determining unit 3036, configured to determine the first guiding information based on a maximum value of each row in the fifth matrix.

Optionally, the determining model 304 is configured to:

decode the first annotation vector set and the first initial input data based on the first guiding information by using the decoder, to obtain the descriptive statement of the target image.

Figure 12:
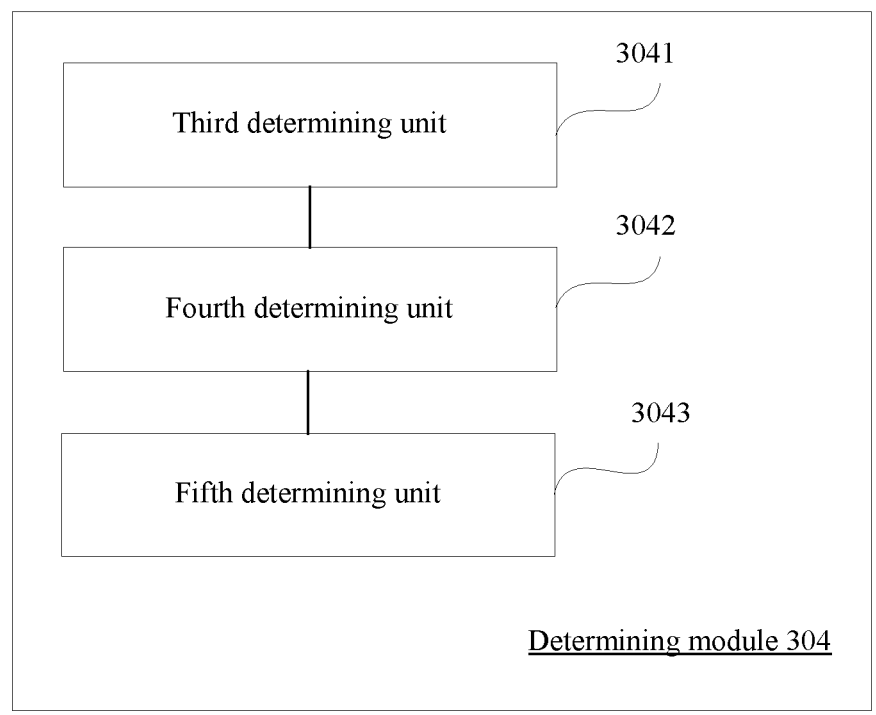
FIG. 12 is a schematic structural diagram of a determining module 304 according to an embodiment of this application.

Optionally, referring to FIG. 12, the determining module 304 includes:

a third determining unit 3041, configured to determine, in a case that the decoder uses an RNN model, and the first RNN model is configured to perform M first sequential steps, for each first sequential step performed by the first RNN model, input data of the first sequential step based on the first guiding information, where M is a quantity of times of circularly processing the input data by the first RNN model, M is a positive integer, and each first sequential step is a processing step of the first RNN model for the input data;

a fourth determining unit 3042, configured to determine output data of the first sequential step based on the input data of the first sequential step, the first annotation vector set, and output data of a previous first sequential step of the first sequential step, where in a case that the first sequential step is placed as a first one in the M first sequential steps, the output data of the previous first sequential step of the first sequential step is obtained through determining based on the first initial input data; and a fifth determining unit 3043, configured to determine the descriptive statement of the target image based on all output data of the M first sequential steps.

Optionally, the third determining unit 3041 is configured to:

determine the input data of the first sequential step based on the first guiding information by using the following formula:

$$x_t = E y_t + Qv$$

where t is the first sequential step, $x_t$ is the input data of the first sequential step, E is a word embedding matrix and is a model parameter of the first RNN model, $y_t$ is an one-hot vector of words corresponding to the first sequential step, where the words corresponding to the first sequential step are obtained through determining based on the output data of the previous first sequential step of the first sequential step, Q is a sixth matrix and is a model parameter of the first RNN model, and v is the first guiding information.

Figure 13:
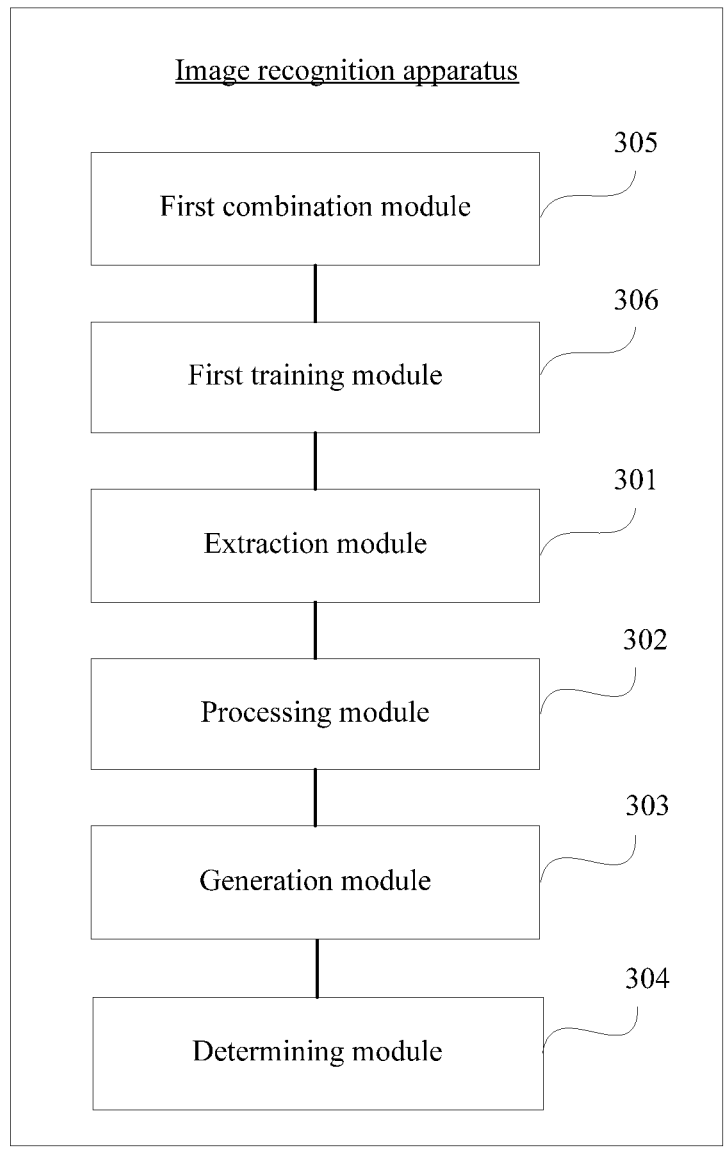
FIG. 13 is a schematic structural diagram of another image recognition apparatus according to an embodiment of this application.

Optionally, referring to FIG. 13, the apparatus further includes:

a first combination module 305, configured to combine a first to-be-trained encoder, a first to-be-trained guiding network model, and a first to-be-trained decoder, to obtain a first cascaded network model; and a first training module 306, configured to train the first cascaded network model based on a plurality of sample images and descriptive statements of the plurality of sample images by using a gradient descent method, to obtain the encoder, the first guiding network model, and the decoder.

Figure 14:
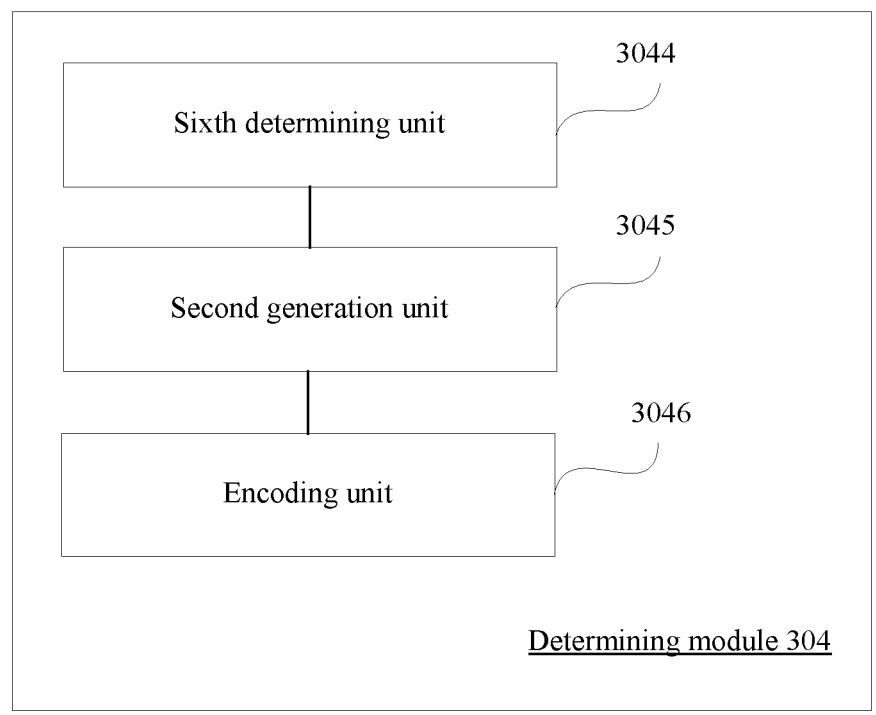
FIG. 14 is a schematic structural diagram of another determining module 304 according to an embodiment of this application.

Optionally, referring to FIG. 14, the determining model 304 includes:

a sixth determining unit 3044, configured to determine a second annotation vector set and second initial input data based on the first guiding information, the first annotation vector set, and the first initial input data by using a reviewer;

a second generation unit 3045, configured to generate second guiding information based on the second annotation vector set by using a second guiding network model, where the second guiding network model is configured to generate guiding information according to the annotation vector set; and an encoding unit 3046, configured to encode the second annotation vector set and the second initial input data based on the second guiding information by using the encoder, to obtain the descriptive statement of the target image.

Optionally, the sixth determining unit 3044 is configured to:

determine, in a case that the first reviewer uses a second RNN model, and the second RNN model is configured to perform N second sequential steps, for each second sequential step performed by the second RNN model, input data of the second sequential step based on the first guiding information, where N is a quantity of times of circularly processing the input data by the second RNN model, N is a positive integer, and each second sequential step is a processing step of the second RNN model for the input data;

determine output data of the second sequential step based on the input data of the second sequential step, the first annotation vector set, and output data of a previous second sequential step of the second sequential step, where in a case that the second sequential step is the first second sequential step in the N second sequential steps, the output data of the previous second sequential step of the second sequential step is obtained through determining based on the first initial input data;

determine the second initial input data based on output data of the last second sequential step in the N second sequential steps; and determine the second annotation vector set based on all output data of the N second sequential steps.

Figure 15:
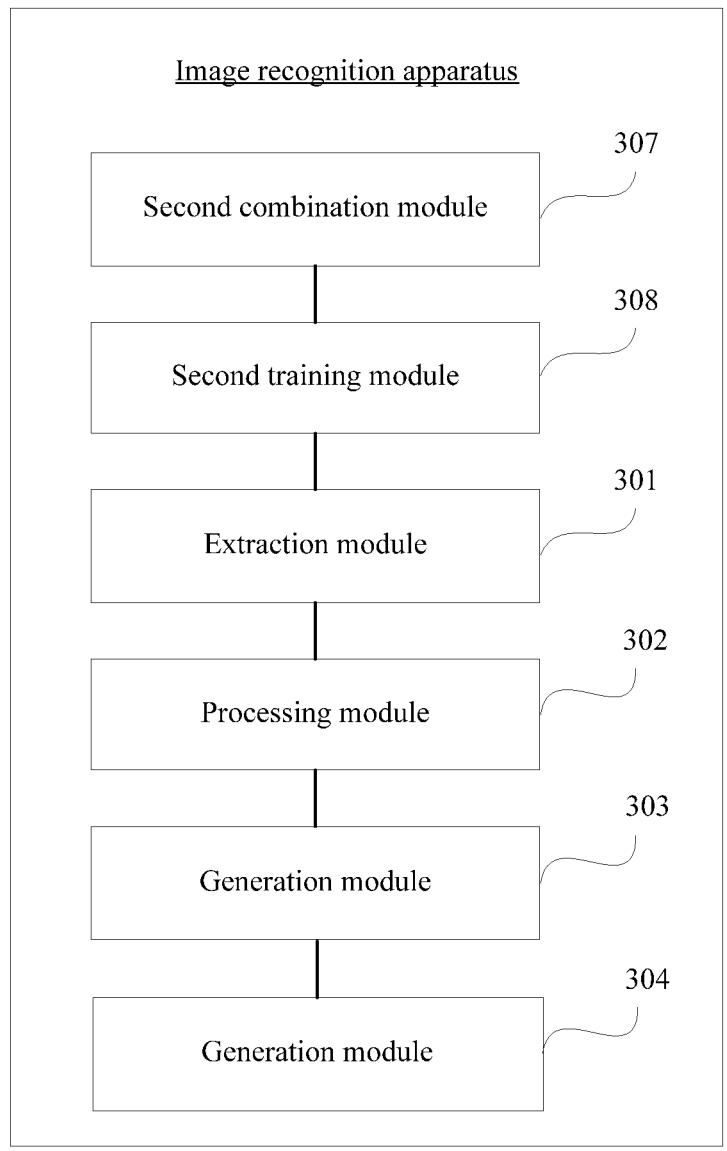
FIG. 15 is a schematic structural diagram of still another image recognition apparatus according to an embodiment of this application.

Optionally, referring to FIG. 15, the apparatus further includes:

a second combination module 307, configured to combine a second to-be-trained encoder, a second to-be-trained guiding network model, a to-be-trained reviewer, a third to-be-trained guiding network model, and a second to-be-trained decoder, to obtain a second cascaded network model; and a second training module 308, configured to train the second cascaded network model based on a plurality of sample images and descriptive statements of the plurality of sample images by using a gradient descent method, to obtain the encoder, the first guiding network model, the reviewer, the second guiding network model, and the decoder.

In some embodiments of this application, a guiding network model is added between an encoder and a decoder, and after an annotation vector set is extracted from an image, guiding information may be generated based on the annotation vector set by using the guiding network model. Because the guiding network model is obtained through training by using an annotation vector set of a sample image, how to accurately generate the guiding information may be adaptively learned in a training process according to the annotation vector set of the image. Therefore, the guiding information generated by using the guiding network model has higher accuracy, and can accurately guiding an encoding process of the images, thereby improving quality of a generated descriptive statement.

When the image recognition apparatus provided in the foregoing embodiment performs image recognition, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the image recognition apparatus and image recognition method embodiments provided in the foregoing embodiments belong to one conception. For the specific implementation process, refer to the method embodiments, and details are not described herein again.

Figure 16:
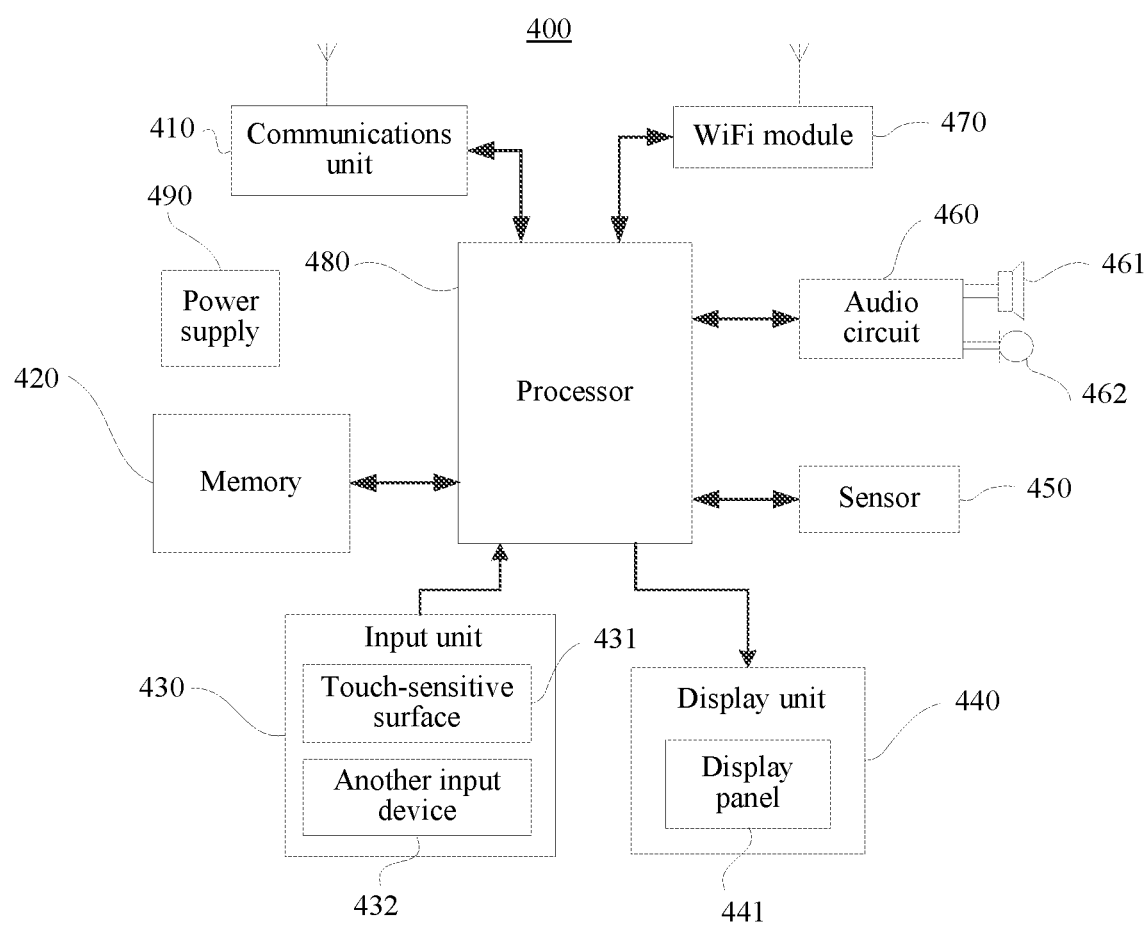
FIG. 16 is a schematic structural diagram of a terminal 400 according to an embodiment of this application.

FIG. 16 is a schematic structural diagram of a terminal 400 according to an embodiment of this application. Referring to FIG. 16, the terminal 400 may include a communications unit 410, a memory 420 including one or more computer readable storage media, an input unit 430, a display unit 440, a sensor 450, an audio circuit 460, a Wireless Fidelity (WiFi) module 470, a processor 480 including one or more processing cores, a power supply 490, and the like. A person skilled in the art may understand that the structure of the terminal shown in FIG. 16 does not constitute a limitation to the terminal, and the terminal may include more components or fewer components than those shown in the figure, or some components may be combined, or a different component deployment may be used.

The communications unit 410 may be configured to receive and transmit signals during an information receiving and transmitting process or a call process. The communications unit 410 may be a network communications device, such as a radio frequency (RF) circuit, a router, or a modem. Particularly, when the communications unit 410 is the RF circuit, the communications unit 410 receives downlink information of a base station, and then hands over the downlink information to one or more processors 480 for processing. In addition, the communications unit 410 transmits related uplink data to the base station. Generally, the RF circuit as the communications unit includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the communications unit 410 may further communicate with a network and other devices through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 420 may be configured to store a software program and module. The processor 480 runs the software program and module stored in the memory 420, to implement various functional applications and data processing. The memory 420 may mainly include a program storage area and a data storage area. The program storage area may store an operating system, an application program required by at least one function (such as a sound playback function and an image display function), and the like. The data storage area may store data (such as audio data and an address book) created according to the use of the terminal 400, and the like. In addition, the memory 420 may include a high-speed random access memory, and may further include a non-volatile memory such as at least one magnetic disk storage device or a flash memory device, or another volatile solid storage device. Correspondingly, the memory 420 may further include a memory controller, to provide access of the processor 480 and the input unit 430 to the memory 420.

The input unit 430 may be configured to receive input digit or character information, and generate a keyboard, mouse, joystick, optical, or track ball signal input related to the user setting and function control. Preferably, the input unit 430 may include a touch-sensitive surface 431 and another input device 432. The touch-sensitive surface 431, which may also be referred to as a touch screen or a touch panel, may collect a touch operation of a user on or near the touch-sensitive surface (such as an operation of a user on or near the touch-sensitive surface 431 by using any suitable object or accessory, such as a finger or a stylus), and drive a corresponding connection apparatus according to a preset program. Optionally, the touch-sensitive surface 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 480. In addition, the touch controller can receive a command transmitted by the processor 480 and execute the command. In addition, the touch-sensitive surface 431 may be a resistive, capacitive, infrared, or surface sound wave type touch-sensitive surface 431. In addition to the touch-sensitive surface 431, the input unit 430 may further include the another input device 432. Preferably, the another input device 432 may include, but is not limited to, one or more of a physical keyboard, a functional key (such as a volume control key and a switch key), a track ball, a mouse, and a joystick.

The display unit 440 may be configured to display information inputted by the user or information provided for the user, and various graphical user interfaces of the terminal 400. These graphical user interfaces may include a graph, a text, an icon, a video and any combination thereof. The display unit 440 may include a display panel 441. Optionally, the display panel 441 may be configured by using a liquid crystal display (LCD), an organic light-emitting diode (OLED), or the like. Further, the touch-sensitive surface 431 may cover the display panel 441. After detecting a touch operation on or near the touch-sensitive surface 431, the touch-sensitive surface 431 transfers the touch operation to the processor 480, so as to determine a type of the touch event. Then, the processor 480 provides a corresponding visual output on the display panel 441 according to the type of the touch event. Although, in FIG. 16, the touch-sensitive surface 431 and the display panel 441 are used as two separate parts to implement input and output functions, but in some embodiments, the touch-sensitive surface 431 and the display panel 441 may be integrated to implement the input and output functions.

The terminal 400 may further include at least one sensor 450 such as an optical sensor, a motion sensor, and other sensors. The optical sensor may include an ambient light sensor and a proximity sensor, where the ambient light sensor may adjust luminance of the display panel 441 according to the luminance of the ambient light, and the proximity sensor may switch off the display panel 441 and/or backlight when the terminal 400 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 400 is not described herein again.

The audio circuit 460, a speaker 461, and a microphone 462 may provide audio interfaces between the user and the terminal 400. The audio circuit 460 may transmit, to the speaker 461, an electric signal that is converted from received audio data. The speaker 461 converts the electric signal into a voice signal for outputting. On the other hand, the microphone 462 converts a collected voice signal into an electric signal. The audio circuit 460 receives the electric signal and converts it into audio data, and outputs the audio data to the processor 480 for processing. Then the processor 480 transmits the audio data to another terminal by using the communications unit 410, or outputs the audio data to the memory 420 for further processing. The audio circuit 460 may further include an earplug jack, to provide communication between a peripheral earphone and the terminal 400.

To implement wireless communication, the terminal device may be configured with a wireless communications unit 470, where the wireless communications unit 470 may be a WiFi module. WiFi belongs to the short distance wireless transmission technology. The terminal 400 may help, by using the wireless communications unit 470, a user to receive and transmit an email, browse a web page, and access stream media, and the like, which provides wireless broadband Internet access for the user. Although the wireless communications unit 470 is shown in the figure, it may be understood that, the wireless communications unit does not belong to a necessary constitution of the terminal 400, and can be omitted within the scope of the essence of the present disclosure according to requirements.

The processor 480 is the control center of the terminal 400, and is connected to various parts of the mobile phone by using various interfaces and lines. By running or executing the software program and/or module stored in the memory 420, and invoking data stored in the memory 420, the processor 480 performs various functions and data processing of the terminal 400, thereby performing overall monitoring on the mobile phone. Optionally, the processor 480 may include one or more processing cores. Preferably, the processor 480 may integrate an application processor and a modem processor. The application processor mainly processes an operating system, a user interface, an application program, and the like. The modem processor mainly processes wireless communication. It may be understood that the foregoing modem processor may alternatively not be integrated into the processor 480.

The terminal 400 further includes the power supply 490 (such as a battery) for supplying power to the components. Preferably, the power supply may be logically connected to the processor 480 by using a power management system, thereby implementing functions such as charging, discharging, and power consumption management by using the power management system. The power supply 460 may further include one or more of a direct current or alternating current power supply, a re-charging system, a power failure detection circuit, a power supply converter or inverter, a power supply state indicator, and any other component.

Although not shown in the figure, the terminal 400 may further include a camera, a Bluetooth module, and the like, which are not further described herein.

Figure 8:
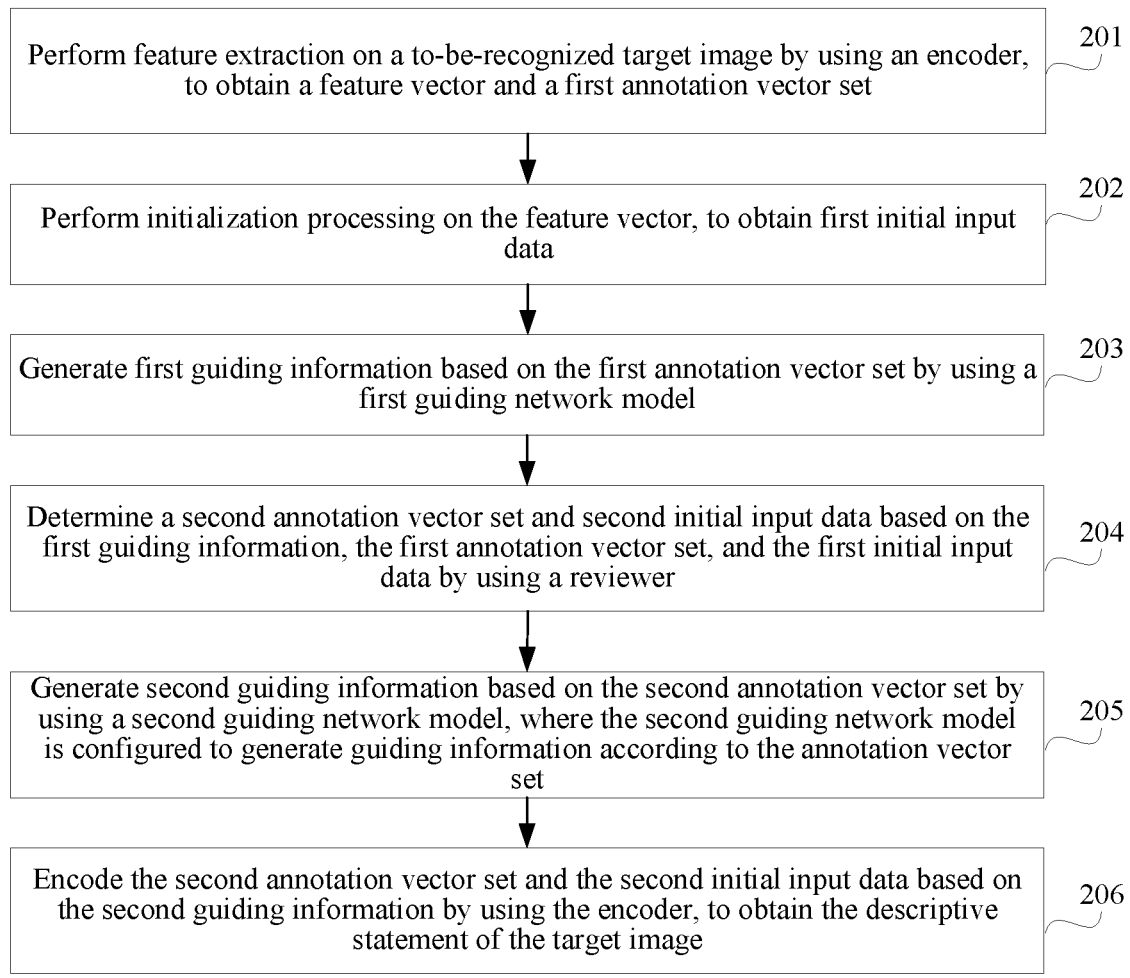
FIG. 8 is a flowchart of another image recognition method according to an embodiment of this application.

In some embodiments, the terminal includes a processor and a memory, the memory further stores at least one instruction, at least one program, and a code set or an instruction set, and the instruction, the program, and the code set or the instruction set are loaded and executed by the processor to implement the image recognition method according to embodiment of the foregoing FIG. 7 or FIG. 8.

In another embodiment, a computer readable storage medium is further provided, the storage medium stores at least one instruction, at least one program, and a code set or an instruction set, and the instruction, the program, and the code set or the instruction set are loaded and executed by a processor to implement the image recognition method according to embodiment of the foregoing FIG. 7 or FIG. 8.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the embodiments of this application, but are not intended to limit the embodiments of this application. Any modification, equivalent replacement, or improvement made within the spirit and principle of the embodiments of this application shall fall within the protection scope of the embodiments of this application.

What is claimed is:

1. An image recognition method, performed by a terminal, comprising:
    performing feature extraction on a target image by using an encoder, to obtain a feature vector and a first annotation vector set;
    performing initialization processing on the feature vector, to obtain first initial input data;
    generating first guiding information based on the first annotation vector set by using a first guiding network model, the first guiding network model being configured to generate guiding information according to an annotation vector set of any image; and
    determining a descriptive statement of the target image based on the first guiding information, the first annotation vector set, and the first initial input data by using a decoder.

2. The method according to claim 1, wherein the generating first guiding information based on the first annotation vector set by using a first guiding network model comprises:
    performing linear transformation on the first annotation vector set based on a first matrix constructed by model parameters in the first guiding network model, to obtain a second matrix; and
    determining the first guiding information based on a maximum value of each row in the second matrix.

3. The method according to claim 1, wherein the first guiding network model is further configured to generate the guiding information according to attribute information of any image, and the attribute information indicating a probability of a predicted word in a descriptive statement of the image; and the generating first guiding information based on the first annotation vector set by using a first guiding network model comprises:
    inputting the target image to a multi-instance model, to obtain attribute information of the target image;
    performing linear transformation on the first annotation vector set based on a third matrix constructed by model parameters in the first guiding network model, to obtain a fourth matrix;
    generating a fifth matrix based on the fourth matrix and the attribute information of the target image; and
    determining the first guiding information based on a maximum value of each row in the fifth matrix.

4. The method according to claim 1, wherein the determining a descriptive statement of the target image based on the first guiding information, the first annotation vector set, and the first initial input data by using a decoder comprises:
    decoding the first annotation vector set and the first initial input data based on the first guiding information by using the decoder, to obtain the descriptive statement of the target image.

5. The method according to claim 4, wherein the decoder uses a first recurrent neural network (RNN) model that performs M sequential steps, and the decoding the first annotation vector set and the first initial input data based on the first guiding information by using the decoder, to obtain the descriptive statement of the target image comprises:
    determining, for each of the M sequential steps performed by the first RNN model, input data of a current sequential step based on the first guiding information, wherein M is a quantity of times of circularly processing the input data by the first RNN model, M is a positive integer, and each of the M sequential steps is a processing step of the first RNN model for the input data;
    determining output data of the current sequential step based on the input data of the current sequential step, the first annotation vector set, and output data of a previous sequential step, wherein
    when the current sequential step is a first sequential step in the M sequential steps, the output data of the previous sequential step is obtained based on the first initial input data; and
    determining the descriptive statement of the target image based on all output data of the M sequential steps.

6. The method according to claim 5, wherein the determining input data of the current sequential step based on the first guiding information comprises:
    determining the input data of the current sequential step based on the first guiding information by using the following formula:

$$x_t = Ey_t + Qv$$

wherein t is the current sequential step, $x_t$ is the input data of the current sequential step, E is a word embedding matrix and is a model parameter of the first RNN model, $y_t$ is an one-hot vector of words corresponding to the current sequential step, wherein the words corresponding to the current sequential step are obtained through determining based on the output data of the previous sequential step, Q is a sixth matrix and is a model parameter of the first RNN model, and v is the first guiding information.

7. The method according to claim 1, wherein before the performing feature extraction on the target image by using the encoder, the method further comprises:
    combining a to-be-trained encoder, a to-be-trained guiding network model, and a to-be-trained decoder, to obtain a first cascaded network model; and training the first cascaded network model based on a plurality of sample images and descriptive statements of the plurality of sample images by using a gradient descent method, to obtain the encoder, the first guiding network model, and the decoder.

8. The method according to claim 1, wherein the determining a descriptive statement of the target image based on the first guiding information, the first annotation vector set, and the first initial input data by using a decoder comprises:
   determining a second annotation vector set and second initial input data based on the first guiding information, the first annotation vector set, and the first initial input data by using a reviewer;
   generating second guiding information based on the second annotation vector set by using a second guiding network model, wherein the second guiding network model is configured to generate guiding information according to an annotation vector set; and
   encoding the second annotation vector set and the second initial input data based on the second guiding information by using the encoder, to obtain the descriptive statement of the target image.

9. The method according to claim 8, wherein the reviewer uses a second RNN model that perform N sequential steps, and the determining a second annotation vector set and second initial input data based on the first guiding information, the first annotation vector set, and the first initial input data by using a reviewer comprises:
   determining, for each of the N sequential steps performed by the second RNN model, input data of a present sequential step based on the first guiding information, wherein N is a quantity of times of circularly processing the input data by the second RNN model, N is a positive integer, and each of the N sequential steps is a processing step of the second RNN model for the input data;
   determining output data of the present sequential step based on the input data of the present sequential step, the first annotation vector set, and output data of a previous sequential step, wherein
   when the present sequential step is a first sequential step in the N sequential steps, the output data of the previous sequential step is obtained based on the first initial input data;
   determining the second initial input data based on output data of a last sequential step in the N sequential steps; and
   determining the second annotation vector set based on all output data of the N sequential steps.

10. The method according to claim 8, wherein before the performing feature extraction on a target image by using an encoder, to obtain a feature vector and a first annotation vector set, the method further comprises:
   combining a second to-be-trained encoder, a second to-be-trained guiding network model, a to-be-trained reviewer, a third to-be-trained guiding network model, and a second to-be-trained decoder, to obtain a second cascaded network model; and
   training the second cascaded network model based on a plurality of sample images and descriptive statements of the plurality of sample images by using a gradient descent method, to obtain the encoder, the first guiding network model, the reviewer, the second guiding network model, and the decoder.

11. A terminal, the terminal comprising a processor and a memory, the processor being configured to implement the following operations:
   performing feature extraction on a target image by using an encoder, to obtain a feature vector and a first annotation vector set;
   performing initialization processing on the feature vector, to obtain first initial input data;
   generating first guiding information based on the first annotation vector set by using a first guiding network model, the first guiding network model being configured to generate guiding information according to an annotation vector set of any image; and
   determining a descriptive statement of the target image based on the first guiding information, the first annotation vector set, and the first initial input data by using a decoder.

12. The terminal according to claim 11, wherein the processor is further configured to implement the following operations:
   performing linear transformation on the first annotation vector set based on a first matrix constructed by model parameters in the first guiding network model, to obtain a second matrix; and
   determining the first guiding information based on a maximum value of each row in the second matrix.

13. The terminal according to claim 11, wherein the first guiding network model is further configured to generate the guiding information according to attribute information of any image, and the attribute information indicating a probability of a predicted word in a descriptive statement of the image; and
   the processor is further configured to implement the following operations:
   inputting the target image to a multi-instance model, to obtain attribute information of the target image;
   performing linear transformation on the first annotation vector set based on a third matrix constructed by model parameters in the first guiding network model, to obtain a fourth matrix;
   generating a fifth matrix based on the fourth matrix and the attribute information of the target image; and
   determining the first guiding information based on a maximum value of each row in the fifth matrix.

14. The terminal according to claim 11, wherein the processor is further configured to implement the following operation:
   decoding the first annotation vector set and the first initial input data based on the first guiding information by using the decoder, to obtain the descriptive statement of the target image.

15. The terminal according to claim 14, wherein the decoder uses a first recurrent neural network (RNN) model that performs M sequential steps, and the processor is further configured to implement the following operations:
   determining, for each of the M sequential steps performed by the first RNN model, input data of a current sequential step based on the first guiding information, wherein M is a quantity of times of circularly processing the input data by the first RNN model, M is a positive integer, and each of the M sequential steps is a processing step of the first RNN model for the input data;
   determining output data of the current sequential step based on the input data of the current sequential step, the first annotation vector set, and output data of a previous sequential step of the current sequential step, wherein when the current sequential step is a first sequential step in the M sequential steps, the output data of the previous sequential step is obtained based on the first initial input data; and determining the descriptive statement of the target image based on all output data of the M sequential steps.

16. The terminal according to claim 11, wherein the processor is further configured to implement the following operations:

combining a to-be-trained encoder, a to-be-trained guiding network model, and a to-be-trained decoder, to obtain a first cascaded network model; and training the first cascaded network model based on a plurality of sample images and descriptive statements of the plurality of sample images by using a gradient descent method, to obtain the encoder, the first guiding network model, and the decoder.

17. The terminal according to claim 11, wherein the processor is further configured to implement the following operations:

determining a second annotation vector set and second initial input data based on the first guiding information, the first annotation vector set, and the first initial input data by using a reviewer;

generating second guiding information based on the second annotation vector set by using a second guiding network model, wherein the second guiding network model is configured to generate guiding information according to an annotation vector set; and encoding the second annotation vector set and the second initial input data based on the second guiding information by using the encoder, to obtain the descriptive statement of the target image.

18. The terminal according to claim 17, wherein the reviewer uses a second RNN model that perform N sequential steps, and the processor is further configured to implement the following operations:

determining, for each of the N sequential steps performed by the second RNN model, input data of a present sequential step based on the first guiding information, wherein N is a quantity of times of circularly processing the input data by the second RNN model, N is a positive integer, and each of the N sequential steps is a processing step of the second RNN model for the input data;

determining output data of the present sequential step based on the input data of the present sequential step, the first annotation vector set, and output data of a previous sequential step of the present sequential step, wherein when the present sequential step is a first sequential step in the N sequential steps, the output data of the previous sequential step is obtained based on the first initial input data;

determining the second initial input data based on output data of a last sequential step in the N second sequential steps; and determining the second annotation vector set based on all output data of the N sequential steps.

19. The terminal according to claim 17, wherein the processor is further configured to implement the following operations:

combining a second to-be-trained encoder, a second to-be-trained guiding network model, a to-be-trained reviewer, a third to-be-trained guiding network model, and a second to-be-trained decoder, to obtain a second cascaded network model; and training the second cascaded network model based on a plurality of sample images and descriptive statements of the plurality of sample images by using a gradient descent method, to obtain the encoder, the first guiding network model, the reviewer, the second guiding network model, and the decoder.

20. A non-transitory computer readable storage medium storing computer program instructions executable by at least one processor to perform:

performing feature extraction on a target image by using an encoder, to obtain a feature vector and a first annotation vector set;

performing initialization processing on the feature vector, to obtain first initial input data;

generating first guiding information based on the first annotation vector set by using a first guiding network model, the first guiding network model being configured to generate guiding information according to an annotation vector set of any image; and determining a descriptive statement of the target image based on the first guiding information, the first annotation vector set, and the first initial input data by using a decoder.

* * * * *